United States Patent [19]

Takeya et al.

[11] Patent Number: 4,899,326

[45] Date of Patent: Feb. 6, 1990

[54] MAGAZINE-HOUSED DISK PLAYER

[75] Inventors: Noriyoshi Takeya; Hidehiro Ishii; Osamu Watanabe; Junichi Yoshio; Kazuhiko Katakami; Takeshi Izumo, all of Saitama, Japan

[73] Assignee: Pioneer Electronic Corporation, Tokyo, Japan

[21] Appl. No.: 108,607

[22] Filed: Oct. 15, 1987

[30] Foreign Application Priority Data

| Oct. 15, 1986 | [JP] | Japan | 61-244965 |
| Oct. 28, 1986 | [JP] | Japan | 61-258031 |
| Nov. 18, 1986 | [JP] | Japan | 61-274986 |
| Nov. 18, 1986 | [JP] | Japan | 61-274987 |
| Nov. 18, 1986 | [JP] | Japan | 61-274988 |
| Dec. 26, 1986 | [JP] | Japan | 61-311260 |
| Dec. 26, 1986 | [JP] | Japan | 61-311261 |

[51] Int. Cl.$^4$ .......................... G11B 17/00; G11B 5/48
[52] U.S. Cl. .......................... 369/36; 369/33
[58] Field of Search .................. 369/36, 37, 38, 39, 369/32, 33

[56] References Cited

U.S. PATENT DOCUMENTS

| 4,210,785 | 7/1980 | Huber et al. | 360/12 |
| 4,222,069 | 9/1980 | Groetschel | 369/6 |
| 4,538,253 | 8/1985 | Ishibashi et al. | 369/34 |
| 4,594,700 | 6/1986 | Takahashi et al. | 369/36 |
| 4,599,716 | 7/1986 | Shimbo | 369/36 |
| 4,675,755 | 6/1987 | Baumeister et al. | 369/36 |

FOREIGN PATENT DOCUMENTS

| 886928 | 10/1978 | Belgium . |
| 169597 | 1/1986 | European Pat. Off. . |
| 2517863 | 10/1983 | France . |
| 58-68278 | 4/1983 | Japan . |
| 58-88884 | 5/1983 | Japan . |
| 60-20354 | 2/1985 | Japan . |
| 60-107788 | 6/1985 | Japan . |
| 61-20282 | 1/1986 | Japan . |
| 61-77184 | 4/1986 | Japan . |
| 7901801 | 3/1979 | Netherlands . |
| 2062935 | 5/1981 | United Kingdom . |
| 8601326 | 2/1986 | World Int. Prop. O. . |
| 8601631 | 3/1986 | World Int. Prop. O. . |

Primary Examiner—Steven L. Stephan
Attorney, Agent, or Firm—Sughrue, Mion, Zinn, Macpeak & Seas

[57] ABSTRACT

A magazine-housed disk reproducing apparatus is disclosed which enables the user to easily determine the contents of the various disks contained in the magazine. The names of tunes and the like provided on the various available disks are stored in a memory. An identifying device detects which magazines containing which disks have been loaded. A display device is activated to indicate to the user the desired content information.

9 Claims, 24 Drawing Sheets

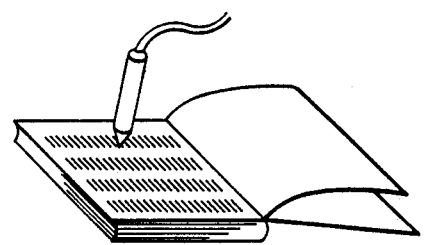
FIG. 7A
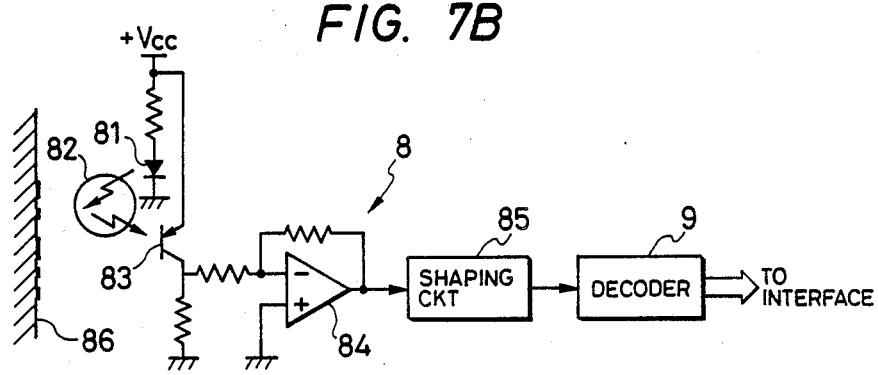
FIG. 7B
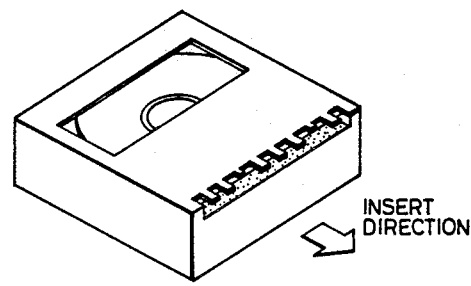
FIG. 10A
FIG. 10B  FIG. 10C  FIG. 10D
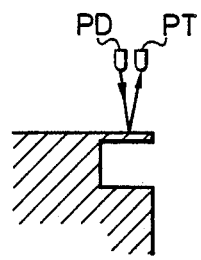
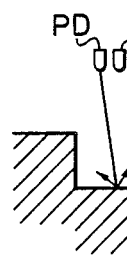
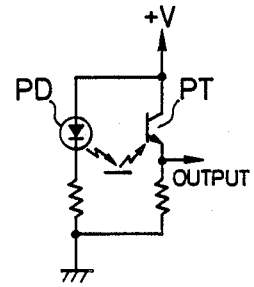

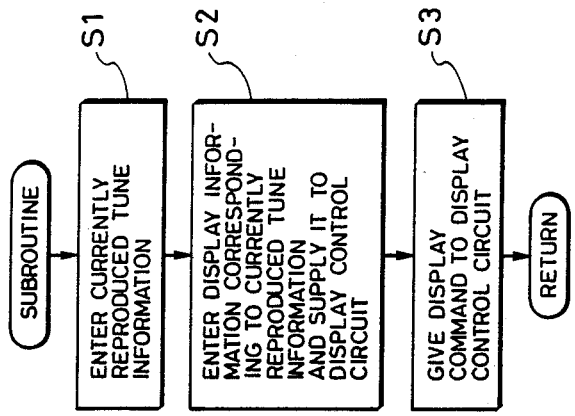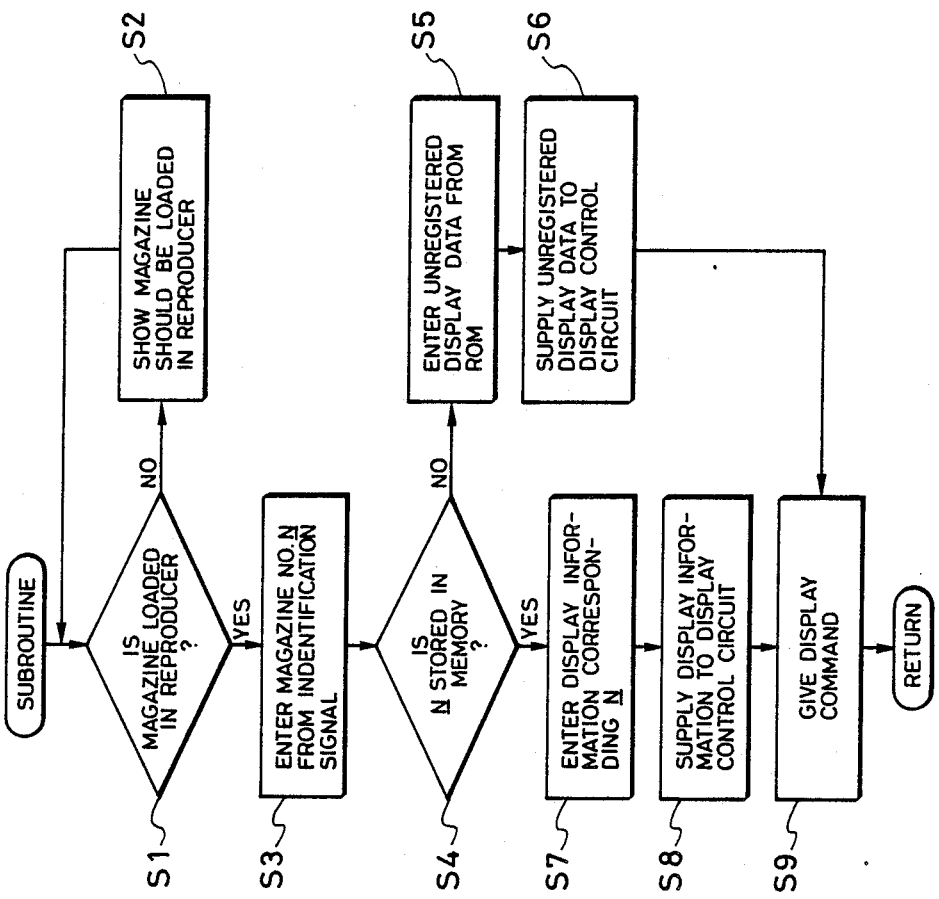

FIG. 11A
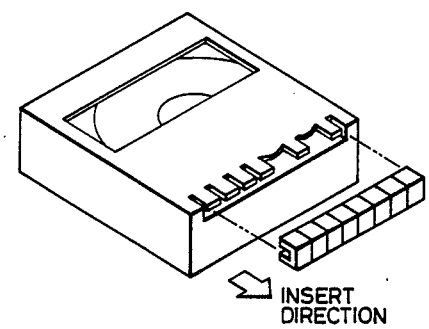
INSERT DIRECTION
FIG. 11B   FIG. 11C   FIG. 11D
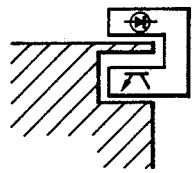 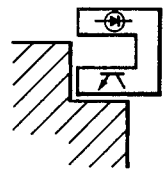 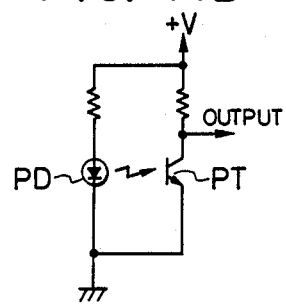
FIG. 11E   FIG. 11F   FIG. 11G
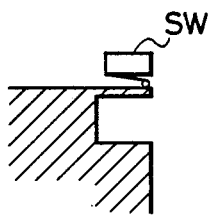 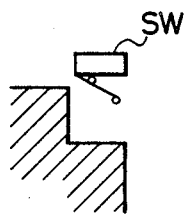 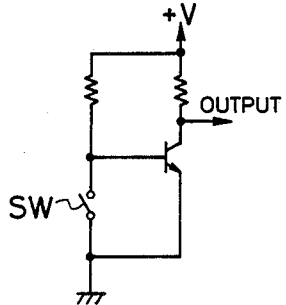

MAGAZINE-HOUSED DISK PLAYER

BACKGROUND OF THE INVENTION

The present invention relates to a magazine-housed disk player.

A magazine-housed disk player has recently been developed in which a plurality of disks on which audio information, video information or the like is recorded are housed in magazines, and one of the disks is selected for reproduction. For example, a magazine shown in FIG. 1 can house several compact disks on which about 120 tunes can be recorded if the reproduction time of each of the tunes is about 3 minutes. Therefore, it is easy to store many relatively short tunes such as jazz and popular music all in the same magazine.

For the magazine-housed disk player, a reproduction program indicating the sequence of reproduction is created before reproduction is commenced to continuously reproduce loaded tunes in accordance with the reproduction program, providing convenience to the user. However, when the user wants to know the contents of the disks housed in the magazine, he or she must take out the disks for confirmation or previously make a memorandum of them. If a plurality of programs are stored in the player, it is necessary to know the reproduction program corresponding to the magazine. Therefore, it is desired to improve the way of enabling the user to know the contents of the disks housed in the magazine and the reproduction program corresponding to the magazine.

Moreover, in a conventional magazine-housed disk player, it is necessary every time a magazine is replaced by another for the production program to be set again depending on the tunes carried by the disks in the magazine. If a plurality of reproduction programs are stored beforehand, it is necessary to determine the contents of the disks housed in each magazine to select one of the reproduction programs. For these reasons, it is troublesome to perform such operations when a plurality of magazines are used for the conventional magazine-housed disk player or a magazine is jointly used for a plurality of such magazine-housed disk players.

In a device proposed by the present applicant, magazines are provided with identification marks. The contents (such as the titles of tunes) of disks housed in each of the magazines are previously stored in a memory provided in a magazine-housed disk player. When the magazine is loaded in the player, the identification mark of the magazine is read to identify the magazine to display the contents of the disks housed in the magazine. It is thus made convenient for the user of the player to perform tune selection or the like.

Although tune selection is made easy by displaying the contents of the disks housed in the magazine, it is not necessary until the end of the reproduction of the selected tune to display the title of the selected tune after the reproduction thereof is started.

There is a desire to display image information (which is hereinafter referred to as tune content information) related to the lyrics of the tunes on the disks housed in the magazine, an explanatory sentence for the tune, an imaginational picture for the tune and so forth.

FIG. 2 shows a front view of a magazine 607 in which a plurality of optical disks 601, 602, 603, 604, 605 and 606 are housed in a stacked state for a conventional disk player.

FIG. 3 shows a front view of the disk player having a tray 608 in which the magazine 607 is housed, operation keys 601 and 611, and a display panel 610.

The operation of the disk player with the optical disks 601, 602, 603, 604, 605 and 606 housed in the tray 606 will now be described. As shown in a block diagram in FIG. 4, the playback operation key 609, which is one of the operation keys, a remote controller or the like is operated to select a desired disk. The selected disk is moved to a disk playback position. Only a lead-in area is provided with a portion for a track number 00. Program information is read and stored in a program memory by the operation of the keys and the reading of a table of contents (which is hereinafter abbreviated as TOC), which serves to determine a format to create a list of contents of the disks by changing the time items of the portion for the track number 00. The reproduction of the disk in the disk playback position is started on the basis of the program information stored in the program memory. The TOC remains stored as long as the magazine 607 is loaded in the tray 608 and electric power is applied to the disk player. The program information remains stored unless a clear key 609 is operated.

When two magazines A and B each containing one or more disks are to be reproduced in a predetermined sequence by the above-described conventional disk player, the magazine A is first loaded in the tray 608 to reproduce the disks in the magazine in accordance with a set program, and the other magazine B is thereafter loaded in the tray to reproduce the disks in the magazine. In that case, the program stored for the disks in the magazine A is erased at the time of reproduction of the disks in the other magazine B. For that reason, when the magazine A is loaded again in the tray 608 to reproduce the disks in the magazine in accordance with the same program, the program needs to be set again. This is troublesome.

Still further, in a conventional disk player, a magazine containing a plurality of information disks is loaded so that the information disks can be selectively reproduced. FIG. 5 shows the magazine 701. A plurality of trays 702, in which the disks 703 are housed, are stacked in the magazine 701 so that the trays can be pulled out of the magazine to selectively play the disks. When the magazine 701 is loaded in the disk player, the number of a desired information disk and the number of a desired track are designated so that ordinary reproduction or programmed reproduction can be performed. The magazine-type disk player has an advantage that the information disks 703 do not need to be alternatively put in the player and can be selectively reproduced in accordance with a large number of programs.

Although the conventional disk player has the above-mentioned advantage, it has the inconvenience that every time a plurality of magazines each containing a plurality of information disks are replaced by other disks, the numbers of the information disks and the program for the disks must be entered again.

SUMMARY OF THE INVENTION

Accordingly, it is an object of the present invention to provide a magazine-housed disk player which enables the user thereof to easily determine the contents of a loaded magazine.

In the magazine-housed disk player provided in accordance with the present invention, a magazine identification means for identifying the loaded magazine is provided and magazine content information (display information) which includes information indicative of the contents of disks housed in the loaded magazine and information indicative of the titles of tunes or the like contained in a reproduction program is read from a memory depending on the output from the magazine identification means and supplied to a image display means.

Further, it is an object of the present invention to provide a magazine-housed disk player in which it is easy to set a reproduction program again every time one magazine is replaced by another.

In the magazine-housed disk player provided in accordance with the present invention, identification marks are previously provided in prescribed positions on the magazines, and the identification mark on a magazine loaded in the player is read to generate an identification signal to perform reproduction in a manner corresponding to the identification signal.

In a magazine-housed disk player provided in accordance with another embodiment of the present invention, magazines are provided with variable characteristic circuits so that reproduction is performed in a manner corresponding to the output from the variable characteristic circuit provided in the magazine loaded in the player.

It is still another object of the present invention to provide a magazine-housed disk player which enables the user of the player to easily obtain tune content information related to the contents of disks in a loaded magazine and to the contents of the tunes of the disks.

In the magazine-housed disk player provided in accordance with this object of the present invention, a magazine identification means is provided to identify the magazine loaded in the player, magazine content information indicative of the contents of the disks housed in the magazine is read from a memory depending on the output from the magazine identification means and supplied to an image display means, and the tune content information indicative of the contents of the tunes of the disks is entered by a means such as a bar code reader and supplied to the image display means in conformity with a command.

In a magazine-housed disk player provided in accordance with a further embodiment of the present invention, each recording medium on which reproduction programs for magazines are are stored is loaded together with the magazine, and the reproduction program corresponding to the loaded magazine is entered from the recording medium to reproduce a disk.

It is a still further object of the present invention to provide a reproduction system for an optical disk player in which a program does not need to be set again every time a magazine is replaced by another in the case that a plurality of magazines containing disks are sequentially loaded in the player and unloaded therefrom to reproduce the disks in accordance with the preset program.

In the reproduction system provided for the optical disk player in accordance with the present invention, a magazine containing one or more optical disks is loaded in the player, TOC information or the like on the optical disks and program information on tunes desired to be reproduced and the sequence of reproduction are stored in the player, and the magazine loaded in the player is identified at the time of the reproduction to automatically perform reproduction in accordance with the program information stored in the player.

Each of the magazines is identified at the time of reproduction in terms of the TOC information or the like on the disks housed in the magazine, so that the reproduction is automatically performed in accordance with the preset program which does not needs to be set again every time the reproduction is performed.

In a still further embodiment of the present invention, there is provided a disk player in which operation keys for entering the numbers of magazines and a display section for showing the magazine numbers entered by the operation keys are provided to enter information on a plurality of magazines and to indicate the number of each magazine when it is loaded in the player.

BRIEF DESCRIPTION OF THE DRAWINGS

FIGS. 7A and 7B are diagrams used for explaining a bar code reader;

FIG. 8A and B are a flowchart describing the control operation of the magazine-housed disk reproducing apparatus of FIG. 6;

FIG. 10A shows an example of a magazine for a magazine-housed disk reproducing apparatus constructed in accordance with a second embodiment of the invention;

FIGS. 10B-10D show examples of identification mark detection devices;

FIG. 11A shows another example of a magazine for a magazine-housed disk reproducing apparatus;

FIG. 11B to 11G show other examples of identification mark detection devices;

DESCRIPTION OF THE PREFERRED EMBODIMENTS

A first embodiment of the present invention, which is a magazine-housed disk player, is hereafter described with reference to the drawings attached hereto.

Figure 6:
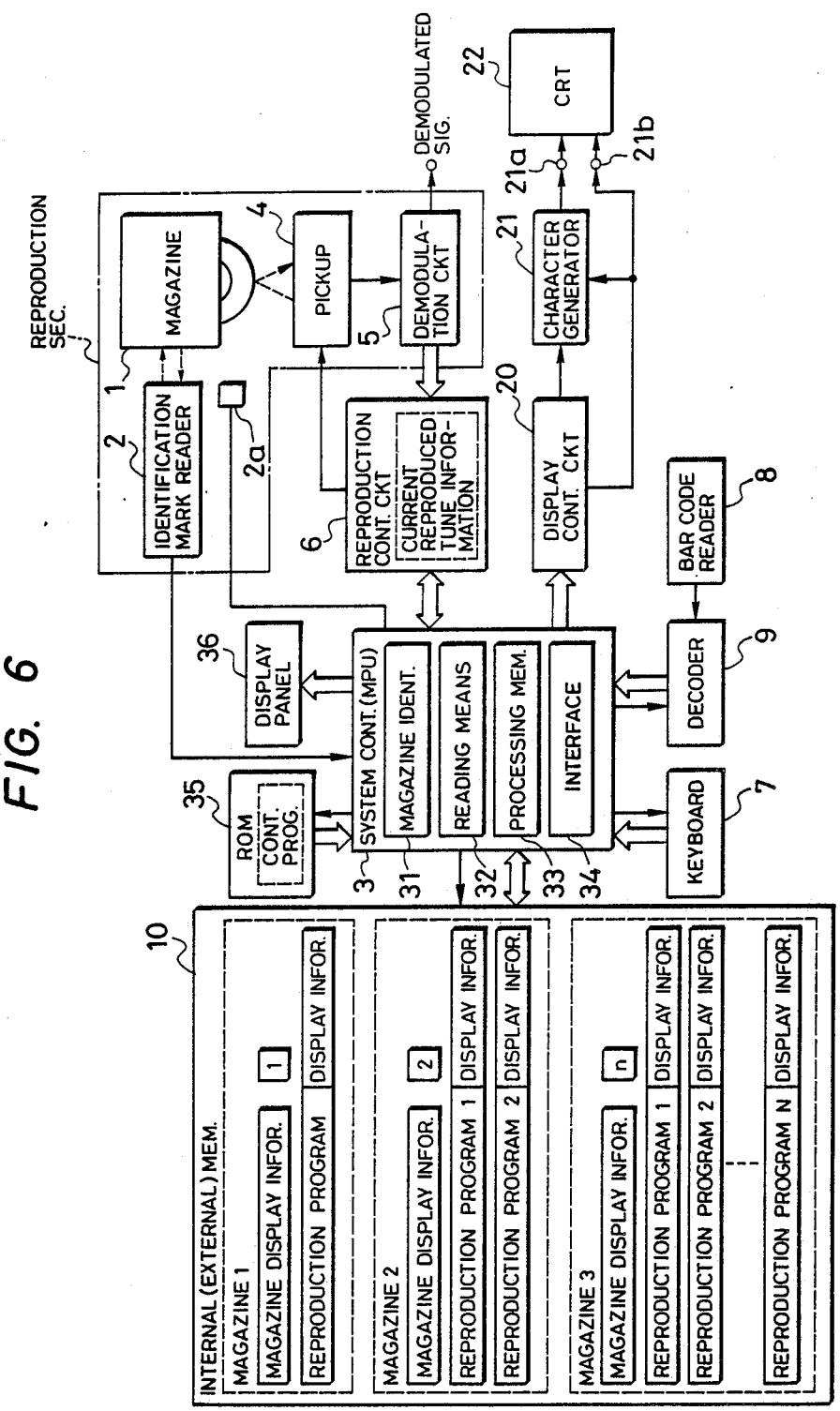
FIG. 6 is a block diagram of a magazine-housed disk reproducing apparatus constructed in accordance with a first embodiment of the invention.

A magazine 1 shown in FIG. 6 is provided with an identification mark as as already proposed by the present applicant. When it is sensed by a loading detector 2a that the magazine 1 is loaded in the magazine-housed disk player, the identification mark is read by an identification mark reading circuit 2. The output from the circuit 2 is supplied to the magazine identification unit 31 of a system controller 3 (implemented with a microprocessor) to identify the number of the magazine 1. One of disks housed in the magazine is taken out of the magazine and moved to a prescribed playback position by a conveyance mechanism (not shown in the drawings), and an information signal recorded on the disk in the prescribed playback position is read by a pickup 4 and demodulated by a demodulation circuit 5 so that a demodulated audio or video signal or the like and a control information signal such as an address signal are obtained. The demodulated signal is supplied to a power amplifier, and then to a loudspeaker or a cathode-ray tube so that recorded information is reproduced. The control information signal is supplied to a reproduction control circuit 6 to appropriately control the pickup 4, etc. In other words, the reproduction control circuit 6 functions to appropriately control a reproducing section inclusive of the magazine 1, the identification mark reading circuit 2, the pickup 4 and the demodulation circuit 5 in accordance with a reproduction program or a reproduction command inputted by manual operation. For example, currently reproduced tune information indicative of a tune being currently reproduced can be utilized for such control. The currently reproduced tune information can be TOC information, the track number, index number, absolute address, and the like, a desired one of which is selected to be used for the control.

Various kinds of command signals, the reproduction program, etc., are entered into the system controller 3 through a keyboard 7. A bar code reader 8 is provided to facilitate such entry. A decoder 9 converts the output from the bar code reader 8 into a signal which can be read by the MPU and which is supplied to the system controller 3 through an interface 34.

The bar code reader 8 is constructed as shown in FIG. 7B. A light beam from a light-emitting diode 81 is transmitted through a spherical lens 82 and irradiated upon a bar code printed on a recording medium 86. The light reflected from the bar code is received by a phototransistor 83, the output of which is amplified by an amplifier 84. The output from the amplifier 84 is shaped by a shaping circuit 85, the output from which is supplied to the decoder 9. As shown in FIG. 7A, the bar code reader 8 can be used to relatively easily enter the reproduction program, the title thereof, the titles of the disks, the titles of all tunes recorded on the disks, the addresses of the tunes, the lyrics of the tunes, etc., which are written in a data book offered together with or separately from the disks. A table of codes corresponding to the alphabet and a table of codes corresponding to other symbols are also contained in the data book so that magazine identification codes, memoranda, and so forth can be also entered into the system controller 3. Such information is stored as display information in an internal or external memory 10 through the system controller 3. A player employing an external memory has been already proposed by the present applicant. For example, an IC (integrated circuit) card can be used as such external memory.

The display information is read by a reading unit 32 and supplied to a display control circuit 20, if necessary. In the circuit 20, the display information is once stored in a register so that the information is supplied together with vertical and horizontal synchronizing signals to a character generator 21 at appropriate display timing. The character generator 21 produces a pattern signal corresponding to the display information. The pattern signal is supplied to a cathoderay tube (CRT) 22 through an external terminal 21a so that an image is made on the CRT in accordance with the pattern signal and the horizontal and the vertical synchronizing signals supplied through another external terminal 21b. A liquid crystal display unit of relatively large display area may be used instead of the CRT 22. The CRT 22 or the liquid crystal display unit may be provided in the magazine-housed disk player.

The system controller 3 enters necessary information into a processing memory 33, on the basis of a control program stored in a read-only memory (ROM) 35, to process the information. The result of the processing is supplied to a corresponding circuit or shown on a display panel 36.

The operation of the system controller 3 is now described with reference to a flowchart shown in FIG. 8A. When electric power is applied to the magazinehoused disk player, the execution of a main control program (not shown in the drawings) is started. After the initial portion of the main control program is executed, a subroutine is executed to read the output from the loading detector 2a to judge whether or not a magazine is loaded in the player, in a step S1. If the magazine is still not loaded, such is shown on the display panel 36 in a step S2, indicating that the magazine should be loaded in the player. The identification mark reading circuit 2 reads the identification mark of the already loaded magazine and supplies the magazine identification unit 31 with an output corresponding to the identification mark. The number of the already loaded magazine is detected by the magazine identification unit 31 in terms of the output. The number of the magazine is entered in a step S3. It is then judged in a step S4 whether or not display information corresponding to the number of the magazine is stored in the internal or external memory 10. When it is judged in the step S4 that the display information is not stored in the memory 10, unregistered display data are entered from the ROM 35 in a step S5 to show that the display information corresponding to the number of the magazine is not stored in the internal or external memory 10. The unregistered display data are then supplied to the display control circuit 20 in a step S6. Upon receiving a display command in a step S9, the display control circuit 20 acts to show the data on the CRT 22.

When the display information corresponding to the number of the magazine is judged to be stored in the internal or external memory, in the step S4, the display information is entered in a step S7. As mentioned above, the display information includes a reproduction program corresponding to the magazine, the titles of tunes, memoranda, etc. After the display information is supplied to the display control circuit 20, a display command is given in steps S8 and S9. The display control circuit 20 acts to temporarily store the display information and to sequentially convert the display information into image information by the character generator 21 and supply the image information to the CRT 22 in accordance with the display command. The contents of the magazine are thus shown on the CRT 22 so that the execution of the subroutine is terminated and that of the main control program is resumed.

Figure 9A:
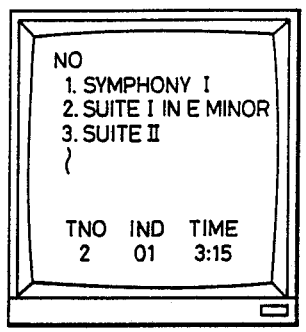
FIGS. 9A to 9E show examples of displayed images.

FIG. 9A shows an example of displaying of titles of tunes contained in the magazine. In a manual operation mode, one of such tunes is selected. Shown at TNO, IND and TIME in FIG. 9A are a track number, an index number and a reproduction time, which are displayed on the CRT 22 in accordance with a control program (not shown).

Figure 9B:
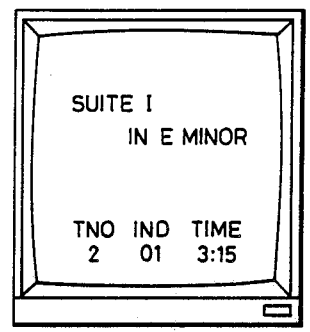
Figure 9C:
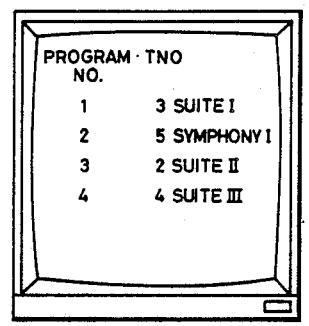

In the main control program, a programmed reproduction mode or the manual operation mode is selected to start reproduction. When the programmed reproduction mode is selected, the reproduction program and the display information for the program are entered from the memory 10 during the execution of the main control program so that the titles of tunes are displayed in the sequence of reproduction, as shown in FIG. 9C. During reproduction, a subroutine shown in FIG. 8B is executed so that currently reproduced tune information indicative of the absolute address of a currently reproduced tune or the title thereof is entered from the reproduction control circuit 6 in a step S1, display information corresponding to the currently reproduced tune information is entered from the memory 10, mixed with color information or the like and supplied to the display control circuit 20 in a step S2, and a display command is thereafter given to the display control circuit in a step S3. For example, if the currently reproduced tune is "SUITE I IN E MINOR", the color of the title of the tune displayed on the CRT 22 as shown in FIG. 9A and 9C is made different in value or the like from those of the titles of other tunes to emphasize the title of the currently reproduced tune. The title of the currently reproduced tune may be displayed in a larger size as shown in FIG. 9B, instead of making the color different.

Figure 9D:
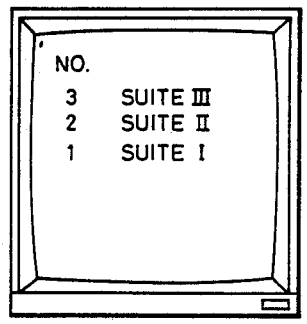
Figure 9E:
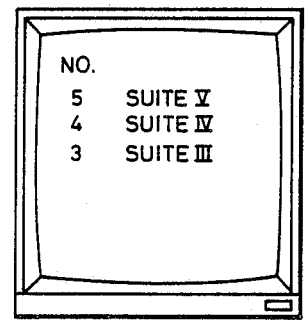

Since the number of all tunes put in each magazine may be so large that it is difficult to display the titles of all tunes within a single frame, a scrolling display method may be adopted, as shown in FIGS. 9D and 9E.

Not only the titles of tunes but also the names of the performer the date of recording, and so forth may be displayed on the CRT 22.

In a magazine-housed disk player provided in accordance with the present invention, the contents of disks housed in a magazine are sent out in the form of image signals when the magazine is loaded in the player, so that the contents of the disks are displayed on an appropriate display unit such as a cathode-ray tube or on a display surface provided on the player. Therefore, it is easy to confirm the contents of the magazine.

A second embodiment of the present invention, which is a magazine-housed disk player, will hereafter be described with reference to the drawings.

FIG. 10A shows a magazine for the magazine-housed disk player. The end of the body of the magazine is provided with a plurality of notches so that a group of projections are formed. The projections can be optionally cut off. Normally, one or more of the projections are cut off in a manner corresponding to the magazine to provide the magazine with an identification mark. If the number of the projections before the cutoff is n, a total number $n^2$ of magazines can be identified. When a magazine provided with the identification mark is loaded in the magazine-housed disk player, light is irradiated upon the end of the body of the magazine from detection elements which are pairs of light-emitting diodes PD and phototransistors PT provided in the player. It is thus detected in terms of the intensity of the reflected light whether or not the projections are cut off. The outputs from the phototransistors are supplied to an identification signal generation circuit not shown in FIGS. 10A, 10B, 10C and 10D. As shown in FIGS. 11A, 11B, 11C, 11D, 11E, 11F and 11G, it may be detected in terms of the presence of transmitted light or the depression of switches SW whether or not the projections are cut off. The detection elements constitute an identification mark detection device.

Figure 12A:
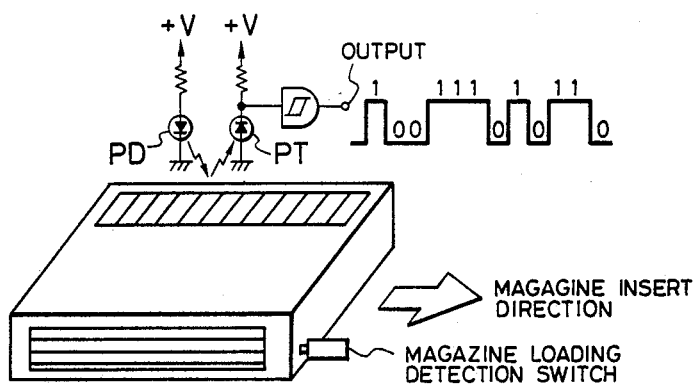
FIGS. 12A to 12C show still other examples of a magazine for a magazine-housed disk reproducing apparatus.

The identification marks of the magazines may be constituted by bar codes as shown in FIG. 12A. Each of the bar codes is read by a reflection-type photocoupler either at the time of insertion of the magazine into the player or by moving the photocoupler after the loading of the magazine into the player. The loading of the magazine in the player is detected by a magazine loading detection switch. The output from the photocoupler is shaped by a Schmitt circuit and then supplied to the identification signal generation circuit.

Figure 12B:
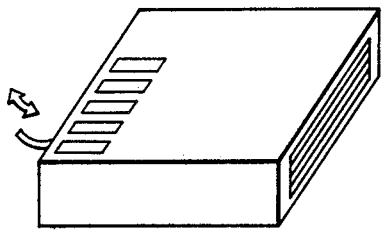

The identification marks of the magazines may be constituted by slits as shown in FIG. 12B, so that the marks can be optionally changed by opening or closing the slits.

Figure 12C:
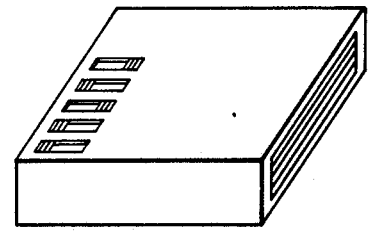

The identification marks of the magazines may be constituted by slits and colors as shown in FIG. 12C, so that the marks can be optionally changed by altering the values of the colors provided in the slits.

Figure 13:
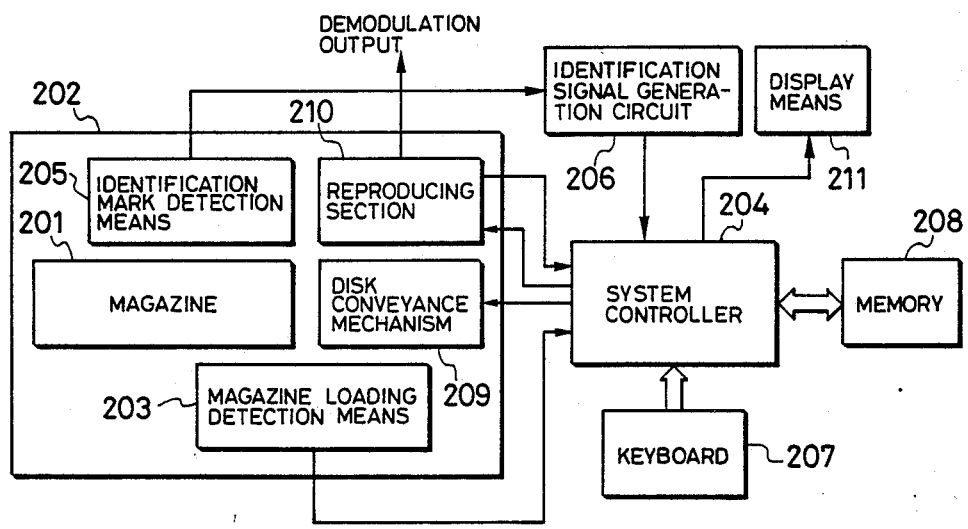
FIG. 13 is a block diagram of the magazine-housed disk reproducing apparatus of the second embodiment of the invention.

The constitution and operation of the magazine-housed disk player for reproducing disks housed in the magazine provided with the identification mark are now described with reference to FIG. 13.

When the magazine 201 is loaded in the player 202, a loading detection signal is supplied from a magazine loading detection unit 203 to a system controller 204. The identification mark of the magazine 201 is detected by the identification mark detection unit 205 so that a detection signal corresponding to the detected identification mark is supplied to the identification signal generation circuit 206. The circuit 206 produces a code signal from the detection signal and supplies the code signal to the system controller 204, which is also supplied with a command signal and a reproduction program from a keyboard 207. The system controller 204 acts to store the reproduction program in a memory 208 whose contents are retained even if electric power is cut off from the player. One of the disks housed in the magazine is moved to a prescribed playback position in a reproducing section 210 by a disk conveyance mechanism 209. The reproducing section 210 reads an information signal recorded on the disk. A demodulation output obtained by demodulating the information signal is supplied to a power amplifier (not shown in the drawings) and then to a loudspeaker or a cathode-ray tube. The system controller 204 regulates the disk conveyance mechanism 209, the reproducing section 210 and a display unit for displaying reproduction information, etc.

Figure 14:
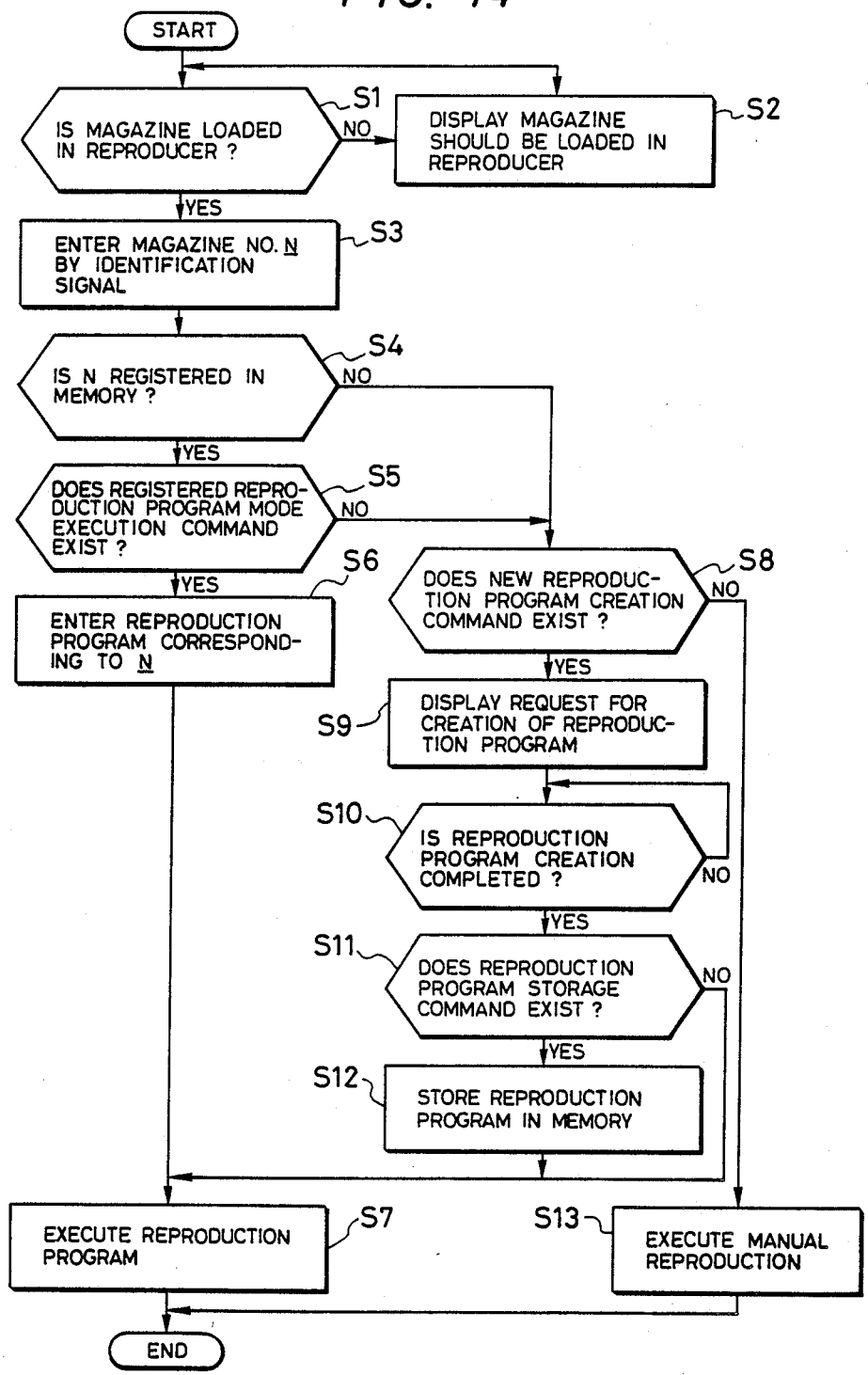
FIG. 14 is a flowchart for describing the operation of a system controller in FIG. 13.

The reproduction of the disk by the magazinehoused disk player will now be described with reference to FIG. 14.

When electric power is applied to the player and an operation command entered through the keyboard 207, it is judged in terms of the presence or absence of the loading detection signal in a step S1 whether or not the magazine is loaded in the player. When it is judged in the step S1 that the magazine is not loaded in the player, it is displayed on the display unit 211 in a step S2 that the magazine should be loaded in the player. When it is judged in the step S1 that the magazine is loaded in the player, the code signal supplied from the identification signal generation circuit 206 is entered as a signal indicating the number N of the magazine in a step S3.

It is now supposed that a reproduction program which corresponds to the magazine N and serves to reproduce the tunes of the disks housed in the magazine exists. When the number N is previously registered in the memory 208 in a step S4 and a registered reproduction program execution command for reproducing the disks in accordance with the reproduction program registered through the keyboard 207 exists in a step S5, the reproduction program corresponding to the magazine N is entered from the memory 208 in a step S6. The disks and the tunes thereon are selected in accordance with the reproduction program so that a series of tune reproduction operations are performed in a step S7. After the series is completed, a registered reproduction mode is terminated.

When the magazine N is not registered in the step S4 and when the registered reproduction program execution command does not exist in the step S5, it is judged in a step S8 whether or not a new reproduction program creation command is given through the keyboard 207 to newly create a reproduction program for the tunes put in the magazine. When it is judged in the step S8 that the new reproduction program creation command is given through the keyboard 207, the display unit 211 is commanded in a step S9 to display a request for the creation of the reproduction program to enter the program through the keyboard 207. When the completion of the creation of the reproduction program is entered through the keyboard 207 in a step S10, it is judged whether or not a storage command for storing the reproduction program in the memory 208 is given through the keyboard 207. When it is judged in a step S11 that the storage command is given through the keyboard 207, the reproduction program is stored in the memory 208. The reproduction program includes identification information which indicates that the program corresponds to the magazine N (in a step S12). When storing the reproduction program in the memory 208 is completed or the reproduction program is not stored in the memory, the reproduction program is executed in the step S7.

When it is judged in the step S8 that a new reproduction program creation command is not given through the keyboard 207, the player is put in another reproduction mode such as a manual reproduction mode in a step S13.

Reproduction programs can thus be previously created for a plurality of magazines and stored in the memory to automatically execute the reproduction program corresponding to the magazine loaded in the magazine-housed disk player.

As described above, the contents of each identification mark can be optionally altered to store a plurality of reproduction programs for a single magazine. For that reason, a desired reproduction program can be easily selected among the other reproduction programs by setting the contents of the identification mark in accordance with the desire of the user of the player.

The present invention is not confined to the above-described identification marks but may be otherwise embodied to provide identification marks such as a punched hole.

In a magazine-housed disk player provided in accordance with the above embodiment of the present invention, identification marks are previously provided in prescribed positions on magazines; and the contents of each of the identification marks are read to perform disk reproduction in a manner corresponding to the read contents. For that reason, a reproduction program does not need to be newly set for each magazine every time it is replaced by another. Therefore, disk reproduction can be quickly started in a predetermined manner.

Another embodiment of the present invention, which is a magazine-housed disk player, will hereafter be described with reference to the drawings.

Figure 15A:
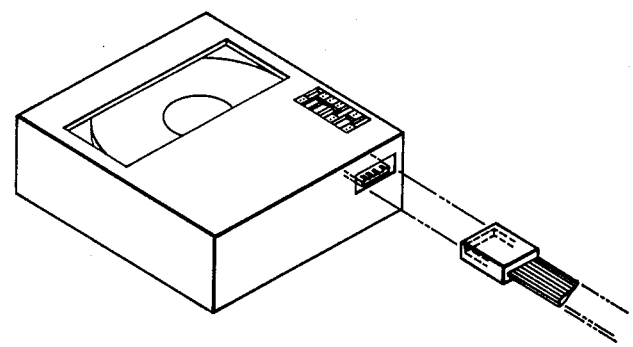
FIGS. 15A and 15B show examples of magazines for a magazine-housed disk reproducing apparatus of a third embodiment of the invention.
Figure 15B:
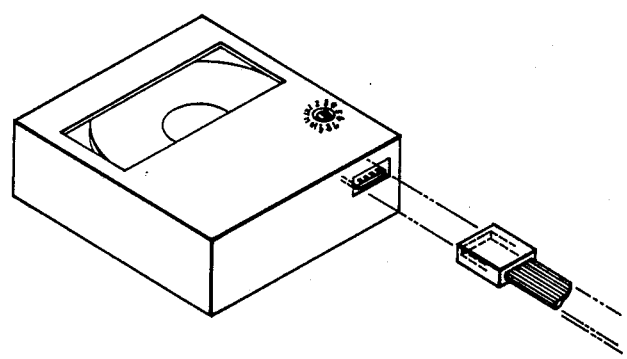
Figure 16A:
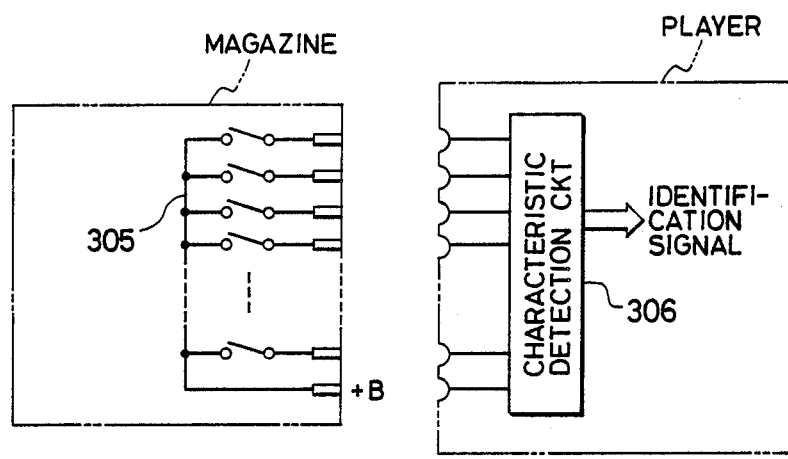
FIGS. 16A and 16B show examples of variable characteristic circuits.

FIG. 15A and 15B show examples of magazines, in each of which a variable characteristic circuit 305 is provided. For instance, the variable characteristic circuit 305 is made of a plurality of switches as shown in FIG. 16A. The switches may be digital switches such as a DIP switch. If the number of the switches is n, $n^2$ magazines can be identified. When each of the magazines is loaded in the magazine-housed disk player, the output terminal of the variable characteristic circuit 305 is connected to a connection terminal provided in the player so that the output from the variable characteristic circuit is supplied to a characteristic detection circuit 306. As a result, the characteristic detection circuit 306 generates an identification signal corresponding to the output from the variable characteristic circuit and supplies the identification signal to a system controller 304 (not shown in FIGS. 15A, 15B, 16A and 16B).

Figure 16B:
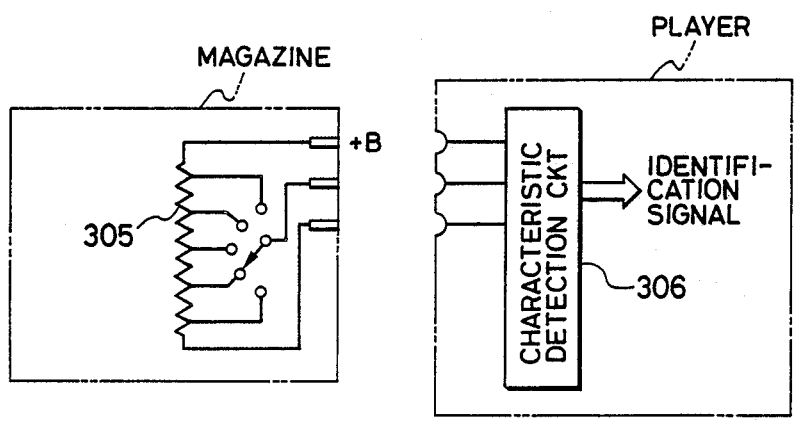

FIG. 16B shows another type of a variable characteristic circuit 305 in which the tap of a voltage divider circuit is shifted. The level of the voltage divider output from the voltage divider circuit is converted into an identification signal by an A/D (analog/digital) converter provided in the characteristic detection circuit 306.

The present invention is not confined to the above-described variable characteristic circuits 305, but may be otherwise embodied to provide a different variable characteristic circuit so long as the output from the circuit is unique for a corresponding magazine.

Figure 17:
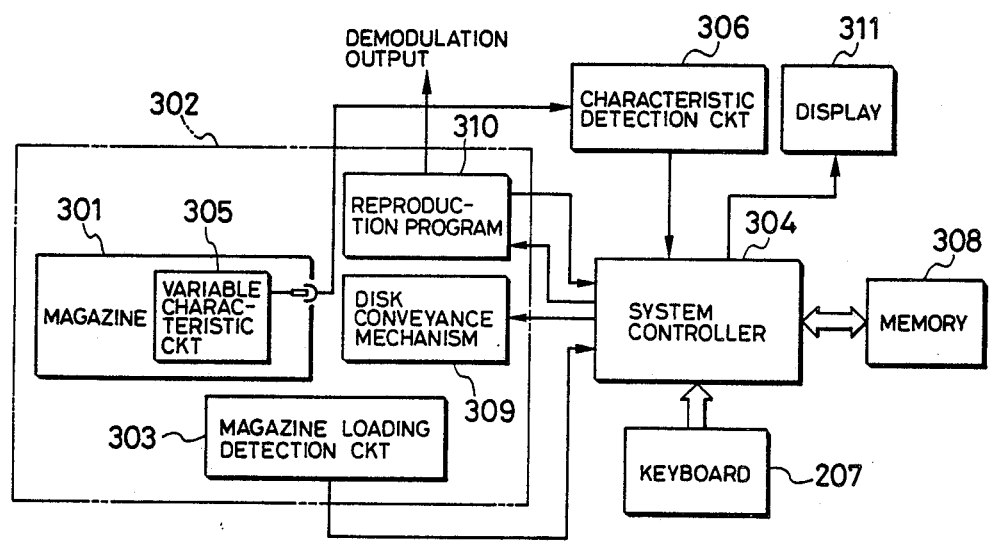
FIG. 17 is a block diagram of the magazine-housed disk reproducing apparatus of a third embodiment of the invention.

The constitution and operation of the magazine-housed disk player for reproducing disks housed in the magazine having the variable characteristic circuit 305 are now described with reference to FIG. 17.

Figure 18:
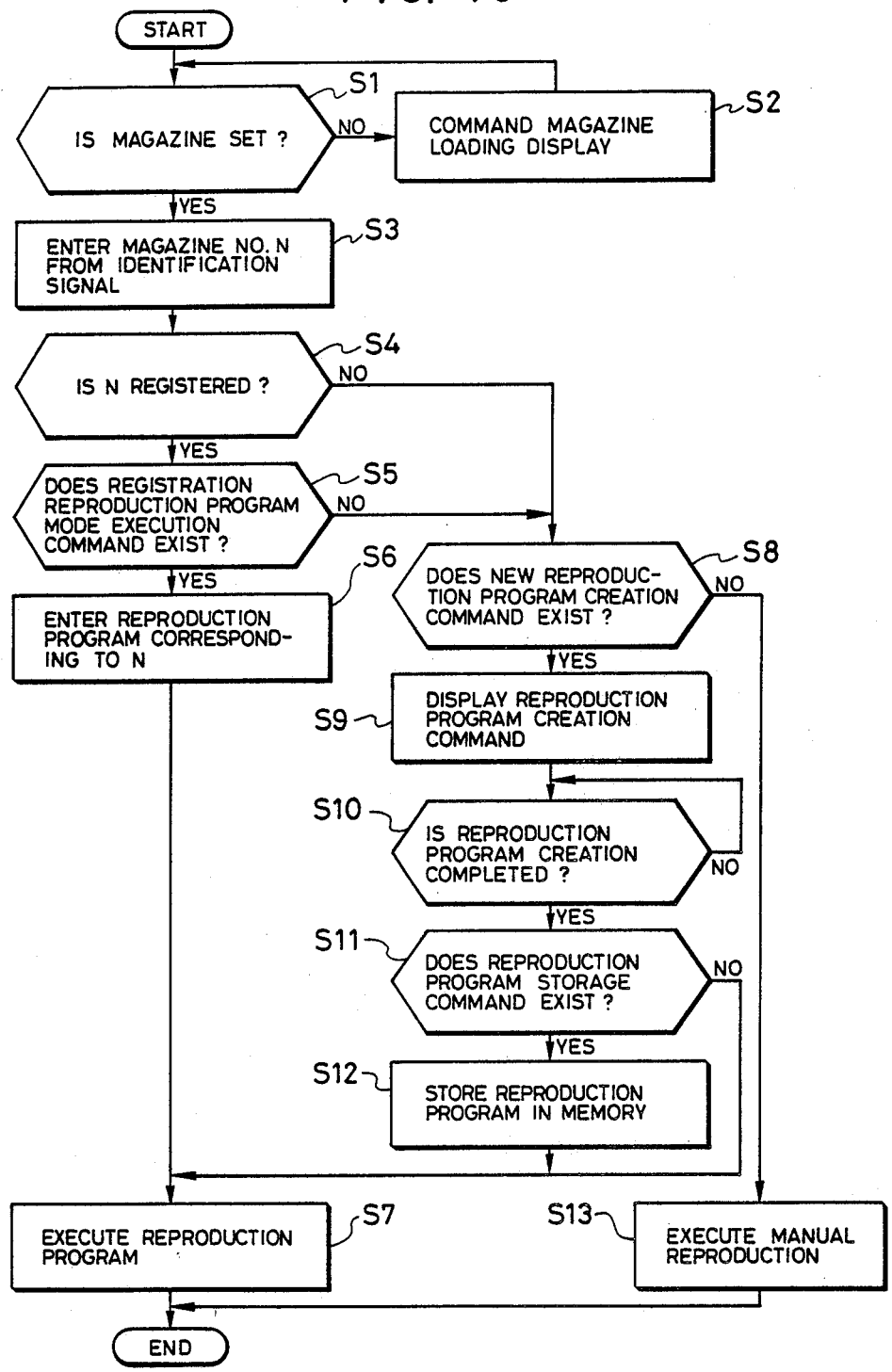
FIG. 18 is a flowchart for describing the operation of a system controller in FIG. 17.

When the magazine 301 is loaded in a magazine loading section 302, the loading is sensed by a magazine loading detection circuit 303 and a loading detection signal is supplied therefrom to the system controller 304. The output from the variable characteristic circuit 305 is supplied to the characteristic detection circuit 306, which generates the identification signal from the supplied output and sends out the identification signal to the system controller 304. The operations of the system controller 304 are shown in detail in the flowchart of FIG. 18.

Figure 20A:
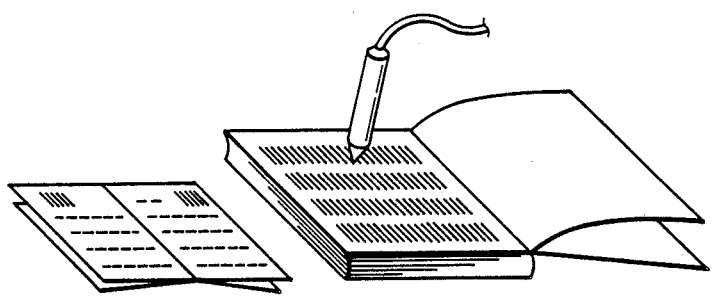
FIGS. 20A to 20C illustrate entry through a bar code reader.
Figure 20B:
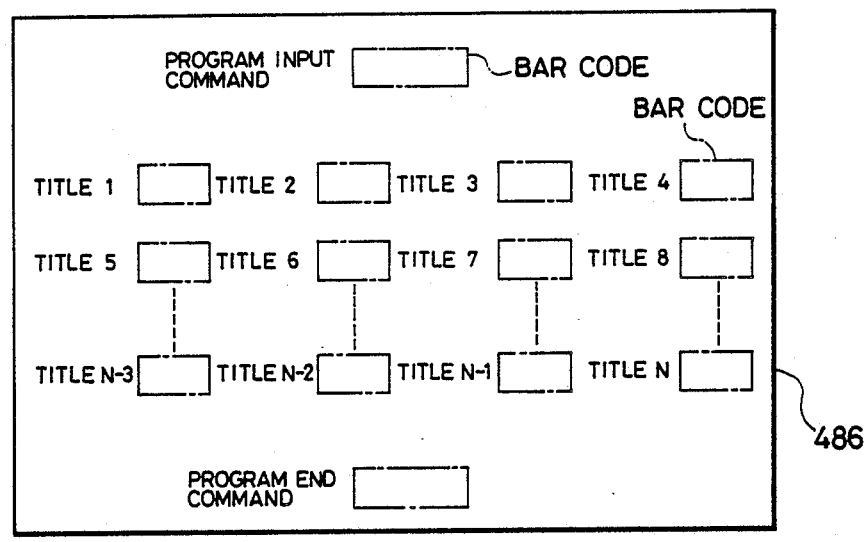
Figure 20C:
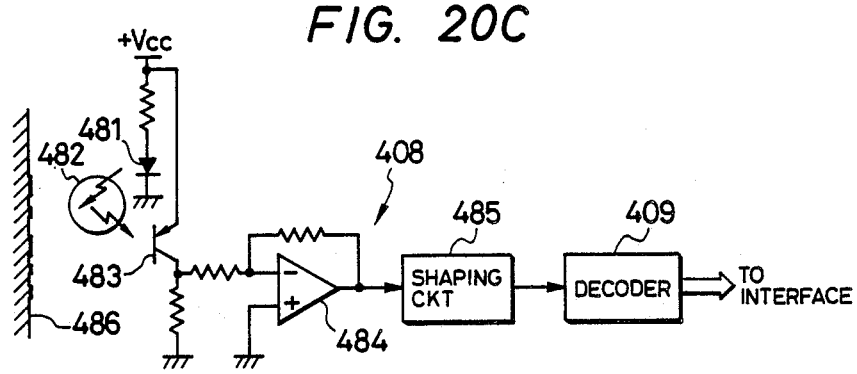

As shown in FIG. 20A, a bar code reader 408 is used to relatively easily enter a necessary part of tune content information on the lyrics of tunes, explanatory sentences for the tunes, imaginational pictures for the tunes, etc., contained in a data book offered together with or separately from disks. The entered tune content information is stored in the memory 410 of a magazine-housed disk player through a system controller 403.

A card reader 408a is provided to read tune content information from an IC (integrated circuit) card or a magnetic card in which the information is previously stored and which is offered separately from the magazinehoused disk player. The output from the card reader 408a is supplied to the system controller 403 through a decoder 409.

Figure 19:
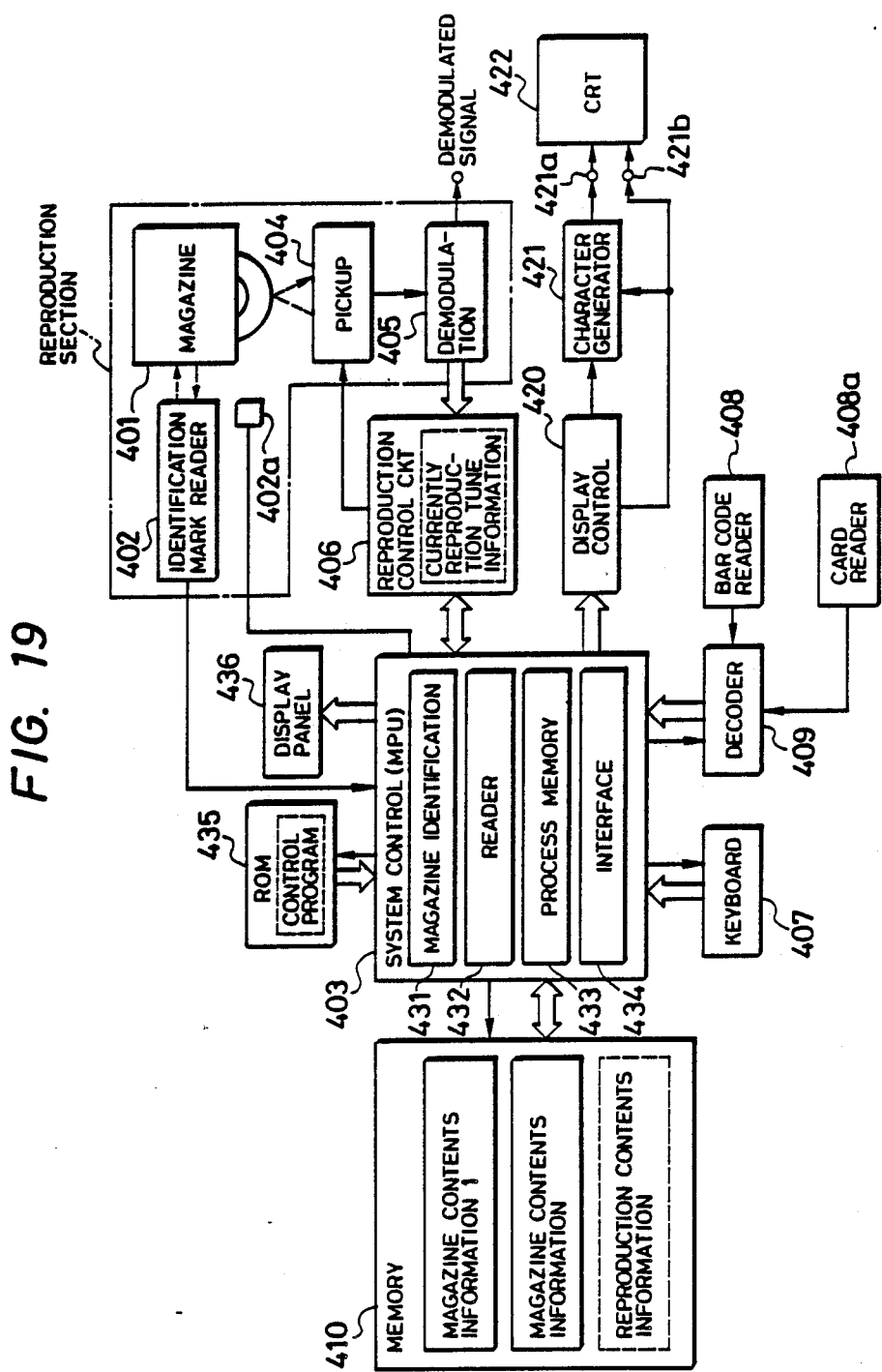
FIG. 19 shows a magazine-housed disk reproducing apparatus of a fourth embodiment of the invention.
Figure 21:
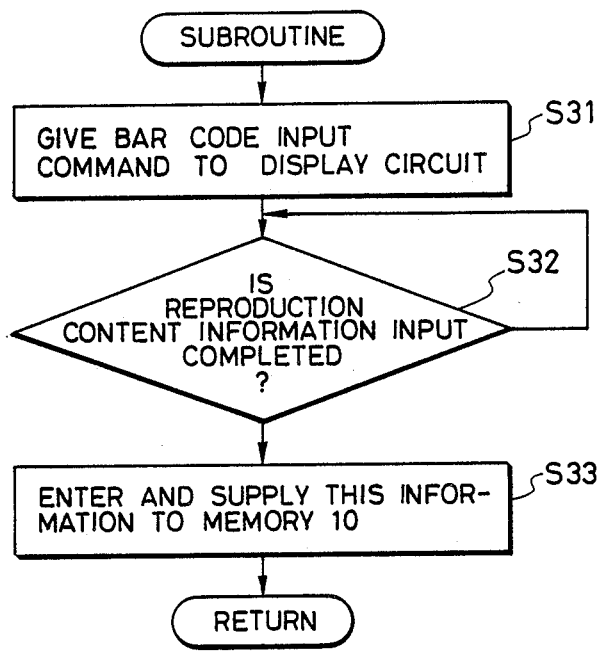
FIG. 21 is a flow chart for describing control operations of the reproducing apparatus of the fourth embodiment.

The control operation of the system controller 403 is similar to that described above with reference to the flowchart shown in FIG. 3A. However, when a command for the entry of the tune content information is given by the user of the magazine-housed disk player through a keyboard 407, the execution of the main control program is replaced by that of a subroutine shown in FIG. 21. In other words, when the command is given, the system controller 403 is put in a state of being able to enter the tune content information and instruct a display circuit 346 to show that it is possible to enter the output from the bar code reader 408 in a step S31. The user of the player uses the bar code reader 408 and the data book to enter the tune content information for a tune the contents of which are to be displayed, while referring to magazine content information (which is the title or like of the tune) shown on a display surface. When it is notified through the keyboard 407 in a step S32 that the entry is completed, the entered tune content information is stored in a prescribed position (which is shown in FIG. 19) in the memory 410 through the system controller 403 in a step S33. After that, the execution of the subroutine is replaced by that of the main control program.

The tune content information includes identification information which makes it possible to selectively read the tune content information on the basis of currently reproduced tune information in a reproduction control circuit 406.

The IC card or the like, in which the tune content information is previously stored and which is offered separately from the magazine-housed disk player, can be put in the card reader 408a to enter a necessary part of the tune content information to store the necessary part in the memory 410.

Figure 22A:
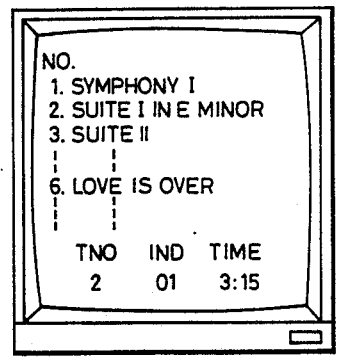
FIGS. 22A and 22B show examples of displaying data.
Figure 22B:
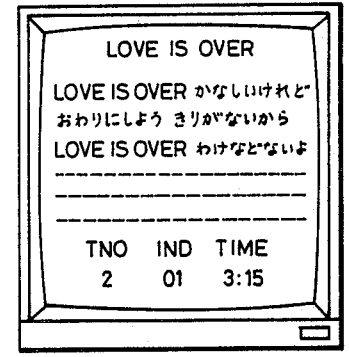

When the reproduction of the desired tune is commanded by manual operation or a reproduction program, reproduction is started. When the currently reproduced tune information is set in the reproduction control circuit 406, the execution of the main control program is replaced by that of the subroutine shown in FIG. 21, so that the currently reproduced tune information supplied from the reproduction control circuit is entered in a step S1. The tune content information corresponding to the currently reproduced tune information is entered from the memory 10 and supplied to a display control circuit 420 in a step S2 (refer gain to FIGS. 3A and 3B). A display command is thereafter given to the display control circuit 420 in a step S3. If the currently reproduced tune is "Love is Over", display of that fact is made on a cathoderay tube 422 as shown in FIG. 22B. After that, execution of the subroutine is replaced by that of the main control program. When the currently reproduced tune is changed to another, the subroutine is executed again from the step S1.

Thus, the magazine content information is displayed on the cathode-ray tube 422 at the time of the loading of the magazine in the magazine-housed disk player, and the tune content information, such as the lyrics of the tune, is displayed on the cathode-ray tube at the time of the reproduction of the tune.

A bar code attached to a lyric card shown in FIG. 20A may be read as a reproduction command for a desired tune to select the tune and display the lyrics or the like of the tune on the cathode-ray tube 422.

An index number or the like may be used as the currently reproduced tune information to scroll the displaying of information such as the lyrics of a tune, a narration, a picture, or a score as the reproduction of the tune progresses.

In this embodiment, the tune content information whose quantity corresponds to one magazine is entered after the loading of the magazine in order to avoid increasing the capacity of the memory. However, if the capacity of the memory is made larger, tune content for tunes on disks in a plurality of magazines can be stored in the memory.

An IC card or the like in which tune content information for each disk is previously stored may be offered together with the disk to make it easy for the user of the magazine-housed disk player to enter the information.

In a magazine-housed disk player provided in accordance with the above embodiment of the present invention, a magazine identification means is provided to identify a magazine loaded in the player; magazine content information indicative of the contents of the disks housed in the magazine is read from a memory and supplied to an image display means on the basis of the output from the magazine identification means; and tune content information indicative of the contents of tunes recorded on the disks is entered by another means so that the tune content information is supplied to the image display means in conformity with a command. Since only a necessary part of the tune content information is entered and stored in the memory, the capacity of the memory does not need to be large. Since the contents of the magazine loaded in the player are displayed before the selection of one of the tunes and image information, such as the lyrics of the reproduced tune and an imaginational picture therefore, is displayed after the selection of the tune, a display surface is efficiently utilized.

Figure 23:
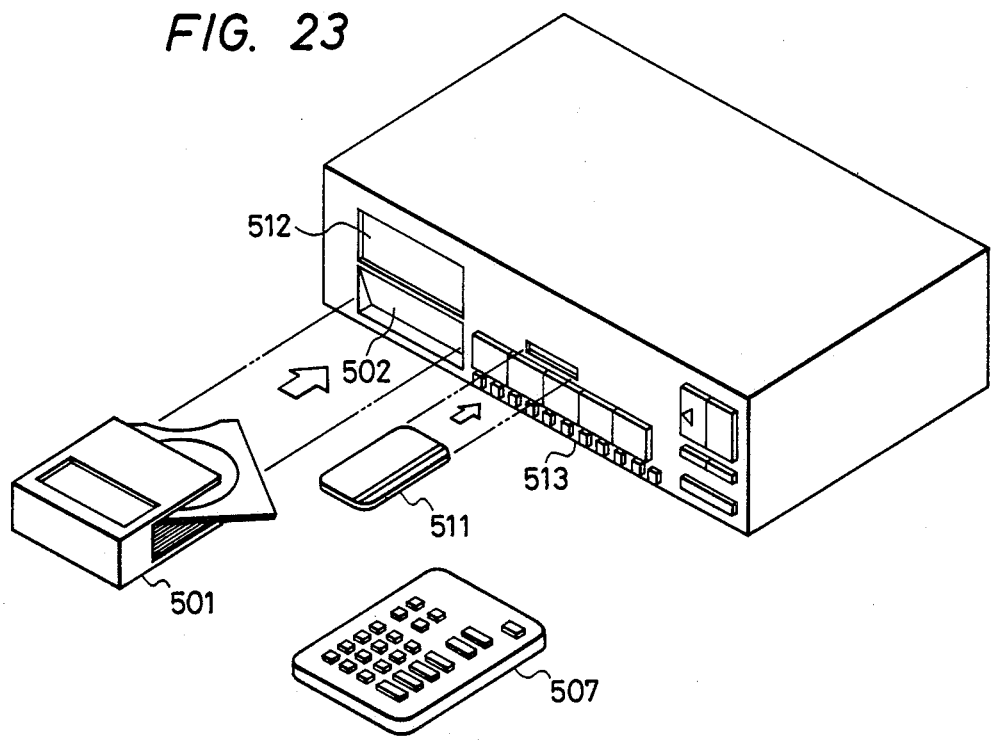
FIG. 23 shows a magazine-housed disk reproducing apparatus constructed in accordance with a fifth embodiment of the invention.

FIG. 23 shows a magazine-housed disk player in accordance with another embodiment of the invention. A magazine 501 and an external memory 511 such as an IC card 511 can be optionally loaded in the player. A reproduction program, various kinds of commands, etc., are entered into the control circuit of the player through a remote-control keyboard 507 or a keyboard 513 built into the body of the player.

Figure 24:
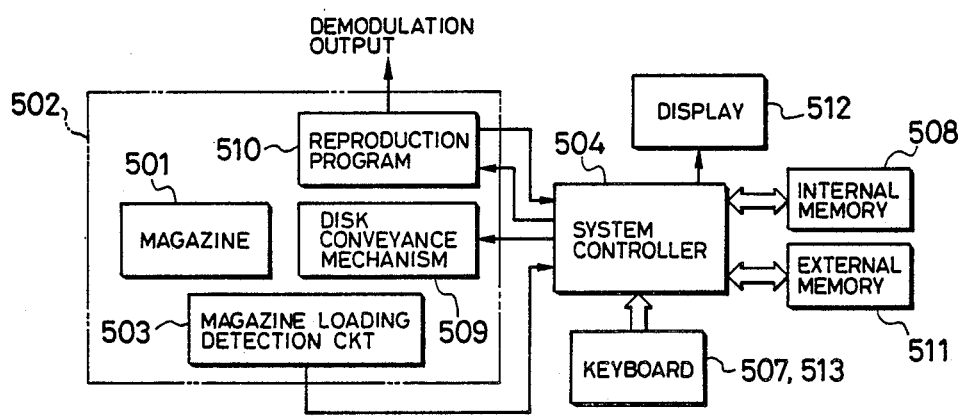
FIG. 24 is a block diagram of the magazine-housed disk reproducing apparatus of FIG. 23.

The constitution and operation of the magazine-housed disk player will be described with further reference to FIG. 24. When the magazine 501 is loaded in a magazine loading section 502, the loading is sensed by a magazine loading detection circuit 503 and a loading detection signal is supplied therefrom to a system controller 504. The system controller 504 is also supplied with a command signal and the reproduction program through the remote-control keyboard 507 or the built-in keyboard 513. The system controller 504 stores the reproduction program in an internal memory 508 or the external memory 511. The stored contents of the memories 508 and 511 are retained even if electric power is cut off from the player. The system controller 504 also functions so that reproduction information such as the reproduction program stored in the external memory 511 and information on a tune to be reproduced is entered if necessary. A disk housed in the magazine 501 is moved to a prescribed playback position in a reproducing section 510 by a disk conveyance mechanism 509. The reproducing section 510 reads an information signal recorded on the disk, and a demodulation output resulting from the demodulation of the read information signal is supplied to a power amplifier (not shown in the drawings) and then to a loudspeaker or a cathode-ray tube (not shown in the drawings). The system controller 4 regulates the disk conveyance mechanism 509, the reproducing section 510 and a display unit 512 for displaying the reproduction information and so forth.

The reproduction of the disk by the magazinehoused disk player is now described with reference to a flowchart shown in FIG. 25. When the electric power is applied to the player and it is commanded through the remote-control keyboard 507 or the built-in keyboard 513 that the player should be put in action, it is judged from the presence or absence of the loading detection signal in a step S1 whether or not the magazine is loaded in the player. When it is judged in the step S1 that the magazine is not loaded in the player, it is shown by the display unit 512 in a step S2 that the magazine should be loaded in the player. When it is judged in the step S1 that the magazine is loaded in the player, it is judged from the presence or absence of a detection signal from a loading detection switch (not shown in the drawings) in a step S3 whether or not the external memory 511 is loaded in the player. When it is judged in the step S3 that the external memory 511 is not loaded in the player, it is shown by the display unit 512 in a step S4 that the external memory should be loaded in the player. Then it is judged in the step S3 that the external memory 511 is loaded in the player, the reproduction program is entered from the external memory and stored in the internal memory 508 in a step S5. After that, it is commanded by the system controller 504 in a step S6 to search for specific information for a disk in a prescribed position in the loaded magazine or another disk or a plurality of disks and to enter the specific information in a step S7. The specific information may be TOC information or the like, the number of the disk or disks, the number of tunes, a reproduction time, the kind of the tunes, etc., and should serve to identify the disk or disks.

A reproduction program execution command is given to the system controller 4 through the remote-control keyboard 507 or the built-in keyboard 513 in a step S8 to execute the reproduction program. If the reproduction program including the specific information for the disk exists in a step S9, the reproduction program is executed in a step S16. If the reproduction program including the peculiar information for the disk does not exist in the step S9, it is judged in a step S10 whether or not a request to newly create a reproduction program through the remote-control keyboard 507 or the built-in keyboard 513 exists. When it is judged in the step S10 that the request does not exist, the execution of a control program is terminated and the player is shifted to a reproduction mode based on manual operation. At that time, the program area of the memory 508 is cleared to erase the reproduction program already stored therein to prepare for the entry of the newly created reproduction program in a step S11. When it is judged in the step S10 that the request exists, the display unit 512 is commanded in a step S12 to show that the reproduction program should be newly created. When a signal indicating that the entry of their production program is completed is entered through the remote-control keyboard 507 or the built-in keyboard 513 in a step S13, it is judged in a step S14 whether or not a command for storing the reproduction program exists. When it is judged in the step S14 that the command does not exist, the reproduction program is executed in the step S16. When it is judged in the step S14 that the command exists, the reproduction program is stored in the external memory 511 in a step S15 and then executed in the step S16. The production program stored in the external memory 511 is thus executed. If a plurality of programs are to be stored in the external memory 511, the titles of the programs are displayed in the step S9 so that the program selected through the remote-control keyboard 507 or the built-in keyboard 513 is executed.

Figure 26:
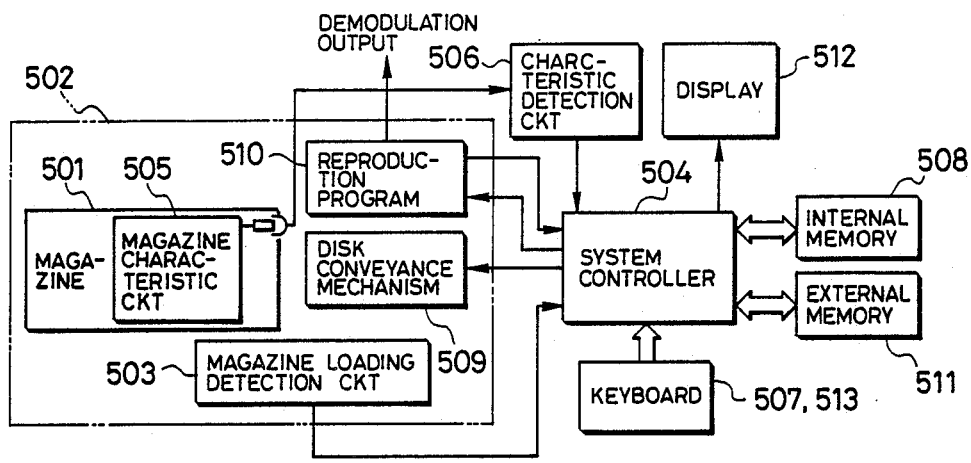
FIG. 26 is a block diagram of a magazine-housed disk reproducing apparatus constructed in accordance with a sixth embodiment of the invention.

FIG. 26 shows still another embodiment of the invention. The mutually corresponding portions shown in FIGS. 24 and 26 are provided with the same reference symbols and common elements will not be described in detail hereinafter.

In the embodiment shown in FIG. 26, a variable characteristic circuit 505 for identifying a magazine is built into the magazine. When the magazine 501 is loaded in the magazine-housed disk player, the variable characteristic circuit 505 is connected to a characteristic detection circuit 506 so that an identification signal indicative of the magazine is supplied from the characteristic detection circuit to the system controller 504 on the basis of the output from the variable characteristic circuit. The other constitution and operation of the magazine-housed disk player are the same as those of the magazine-housed disk player shown in FIG. 24.

Figure 27:
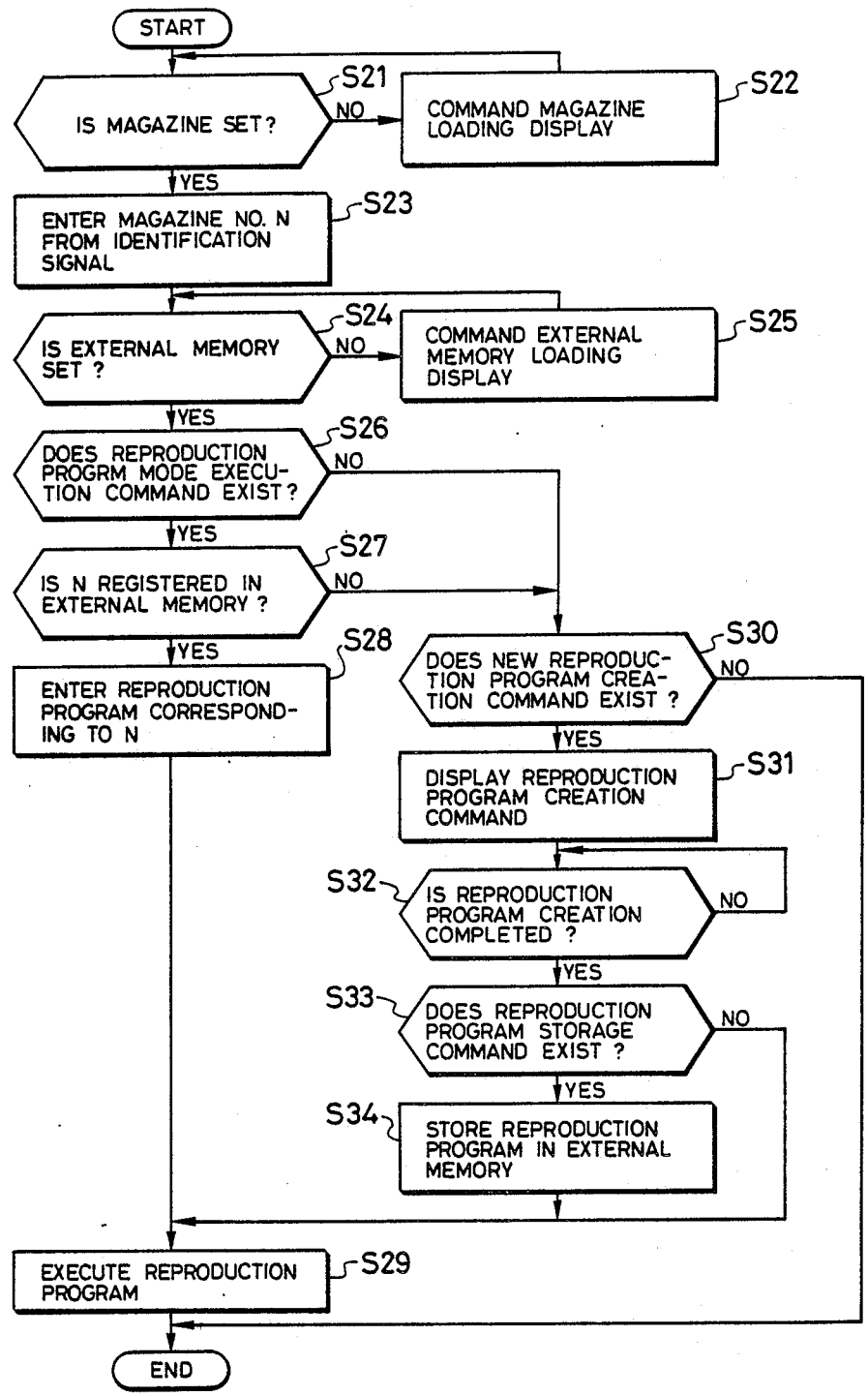
FIG. 27 is a flowchart for describing the control operation of the system controller shown in FIG. 26.

The reproducing operation of the magazine-housed disk player shown in FIG. 26 will now be described with reference to a control flowchart shown in FIG. 27.

When electric power is applied to the player and a command for starting its operation is given through a keyboard 507 or a built-in keyboard 513, it is judged from the presence or absence of a loading detection signal in a step S21 whether or not a magazine is loaded in the player. When it is judged in the step S21 that the magazine is not loaded in the player, it is shown by a display unit 512 in a step S22 that the magazine should be loaded in the player. When it is judged in the step S21 that the magazine is loaded in the player, the identification signal supplied from the characteristic detection circuit 506 is entered as a magazine number n is a step S23. It is there after judged in a step S24 whether or not an external memory 511 is loaded in the player. When it is judged in the step S24 that the external memory 511 is not loaded in the player, it is shown by the display unit 512 in a step S25 that the external memory should be loaded in the player. When it is judged in the step S24 that the external memory 511 is loaded in the player, it is judged in a step S27, on the basis of the presence of a registered reproduction program execution command entered through the remote-control keyboard 507 or the built-in keyboard 513 whether or not a reproduction program which corresponds to the magazine N and serves to reproduce the tunes of disks housed in the magazine is registered in the memory 511. When it is judged in the step S27 that the reproduction program is registered in the memory 511, the reproduction program is entered from the memory in a step S28. A disk and a tune are selected in accordance with the reproduction program in a step S29 so that the tune is reproduced. When the reproduction of the tune is finished, the reproducing operation shown in the control flowchart in FIG. 27 is completed.

When it is judged in the step S26 that the registered reproduction program execution command is not present, and when it is judged in the step S27 that the magazine N is not registered in the external memory 511, it is judged in a step S30 whether or not a reproduction program new creation command is given through the remotecontrol keyboard 507 or the built-in keyboards 513 to newly create a reproduction program for tunes put in the magazine. When it is judged in the step S30 that the reproduction program new creation command is given through the keyboard 507 or 513, the display unit 512 is commanded in a step S31 to show that the reproduction program should be inputted to cause the user of the player enter the reproduction program through the keyboard 507 or 513. When the completion of the creation of the reproduction program is notified through the keyboard 507 or 513 in a step S32, it is judged in a step S33 whether or not a storage command for storing the reproduction program in the external memory 511 is given through the keyboards 507 or 513. When it is judged in the step S33 that the storage command is given through the keyboards 507 or 513, the production program is stored in the external memory 511. The created reproduction program includes identification information which indicates that the program corresponds to the magazine N in a step S34. When it is judged in the step S33 that storing the production program into the external memory 511 is completed or the reproduction program is not stored in the memory, there production program is executed in the step S29 so that the reproducing operation shown by the control flowchart in FIG. 27 is terminated and the player is caused to start a reproducing operation, as shown by another control flowchart for the manual reproduction mode, for example.

Such reproduction programs are previously created for a plurality of magazines and stored in the external memory so that the reproduction program corresponding to the magazine loaded in the magazine-housed disk player is automatically executed. Since the contents of the variable characteristic circuit 505 can be optionally changed to store a plurality of reproduction programs for one magazine, the contents of the variable characteristic circuit can be set depending on the desire of the user of the player to easily select a desired one of the reproduction program. A resistance value selection circuit, a variable output voltage circuit, a digital switch circuit or the like can be used as the variable characteristic circuit 505. An identification code may be provided on the magazine, instead of the variable characteristic circuit 505, so as to be optically read and subjected to photoelectric conversion.

Figure 25:
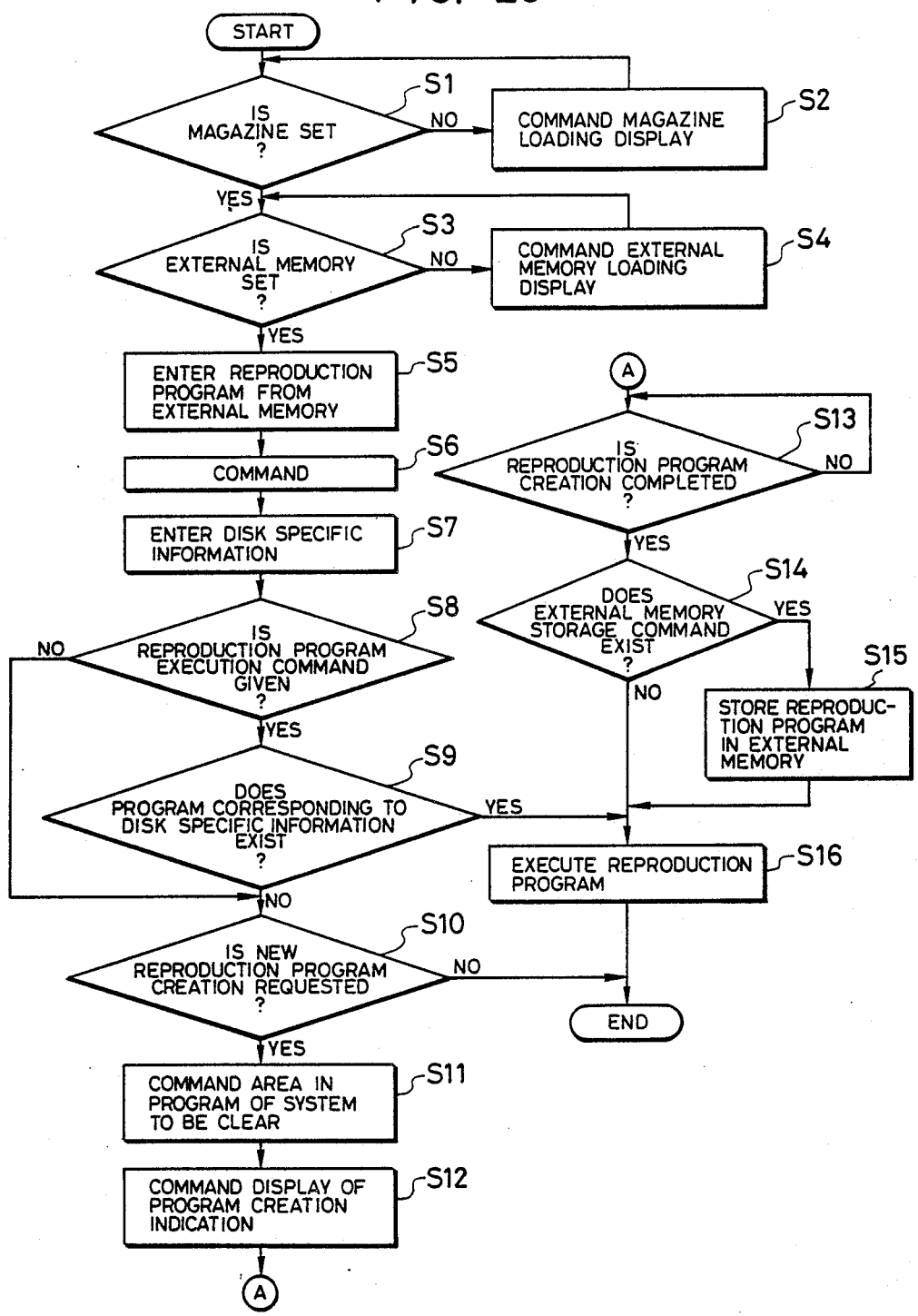
FIG. 25 is a flowchart used for describing the control operation of the system controller shown in FIG. 24.

Although the contents of the external memory are previously entered into the magazine-housed disk reproduced in the flowchart shown in FIG. 25, the specific information for the disk may be previously read and only a program including such information may be thereafter entered from the external memory into the player.

A magnetic card, an IC card, an optical card, a magnetic disk or the like can be used as the external memory.

In a magazine-housed disk player provided in accordance with the present invention, reproduction programs for magazines are stored in an external memory so that reproduction by the use of a plurality of magazinehoused disk players or the use of a plurality of magazines can be quickly started because the reproduction program does not need to be newly set for the magazine every time the other magazine is replaced by the former.

Figure 28:
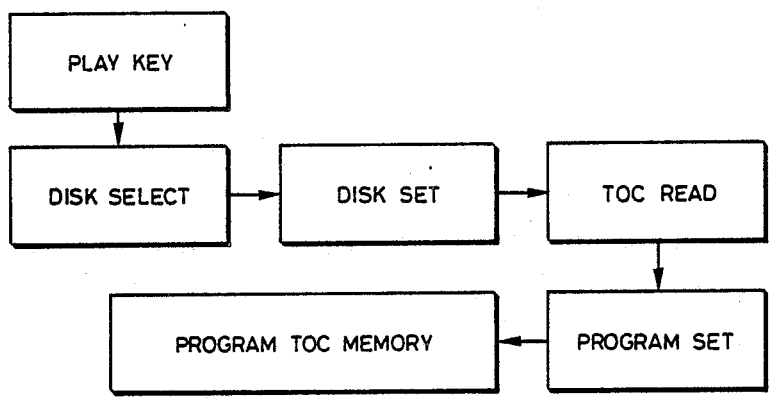
FIG. 28 illustrates a process in which disk information and program information are stored in a disk reproducing apparatus of a seventh embodiment of the invention.
Figure 29:
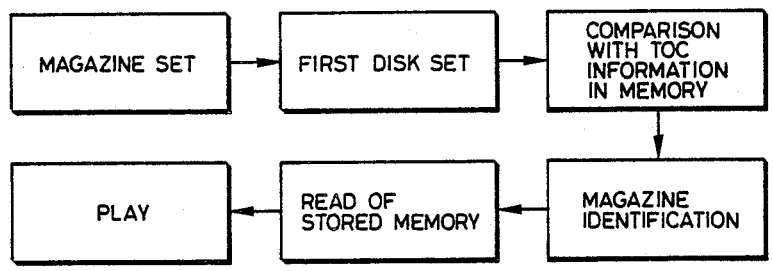
FIG. 29 illustrates a process in which a loaded magazine is identified in terms of the information stored in the process of FIG. 28 and in which program information stored in the loaded magazine is read.
Figure 30:
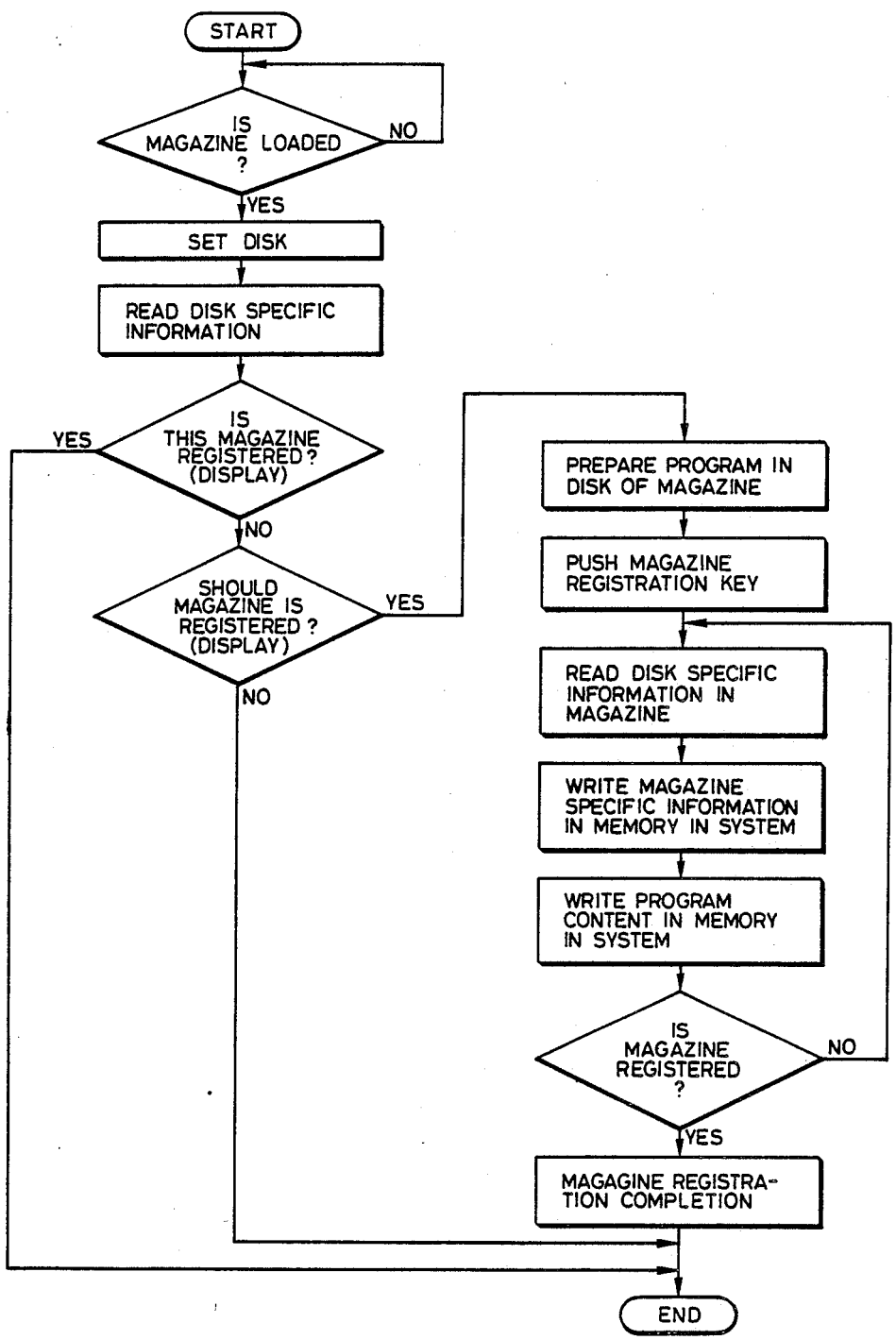
FIG. 30 is a flowchart of a process in which a magazine is automatically identified in terms of specific information on a disk.
Figure 31:
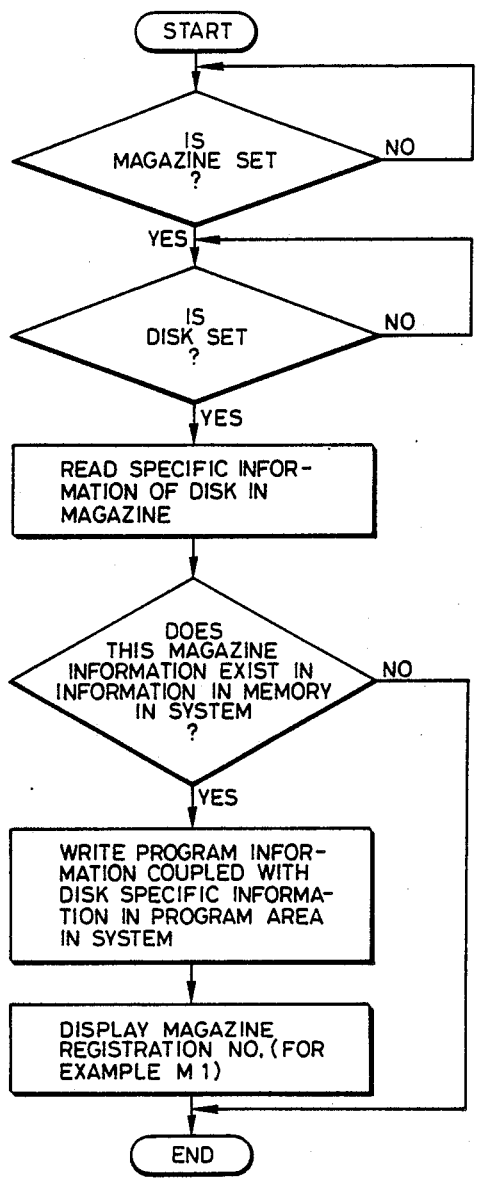
FIG. 31 and FIG. 32 are flowcharts showing reading and writing in a process in which table of contents information is sequentially read during reproduction.
Figure 32:
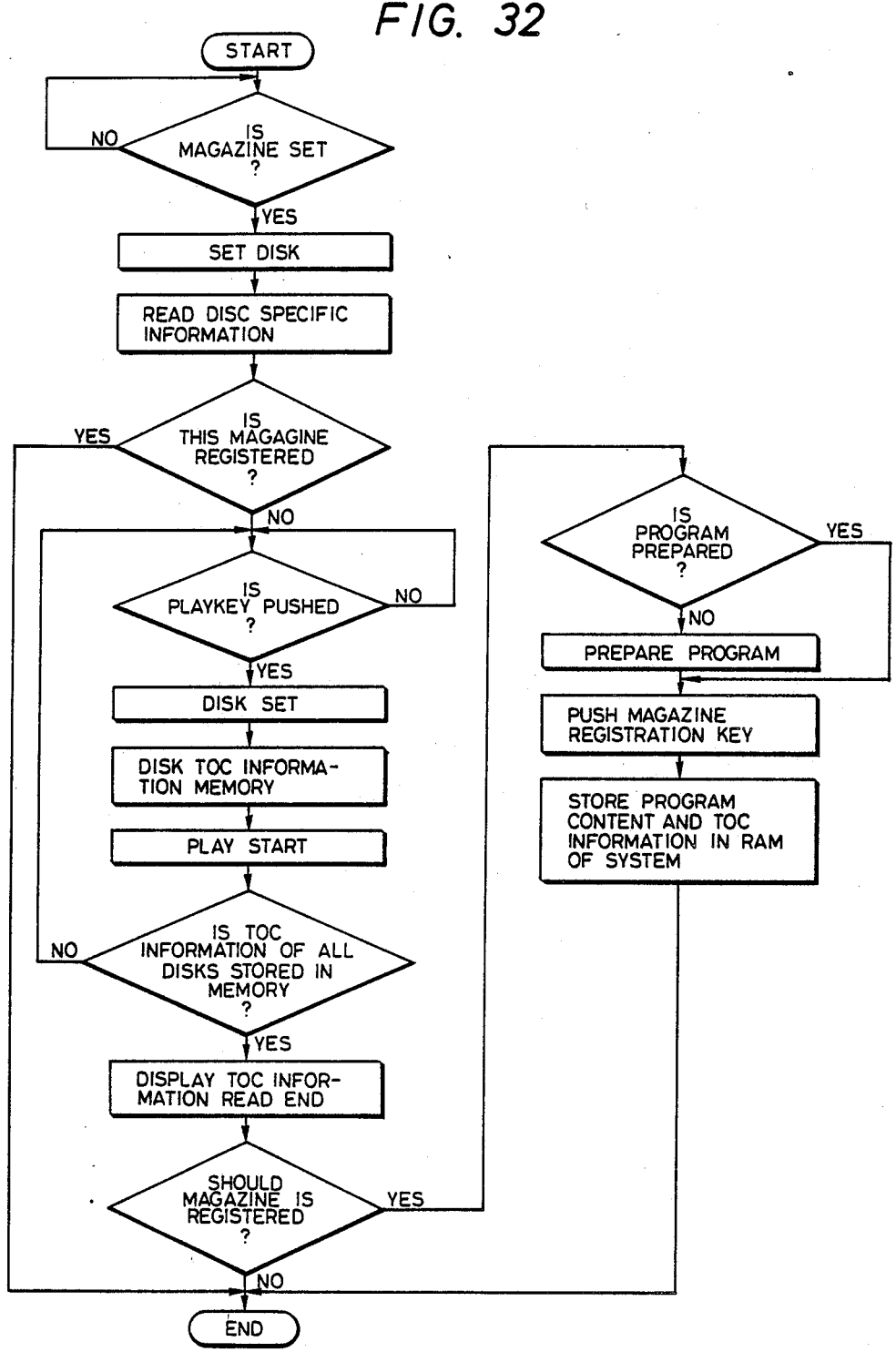

FIGS. 28 and 29 are block diagrams of a reproduction system for an optical disk player constructed according to a yet further embodiment of the present invention. The block diagram shown in FIG. 28 illustrates a process in which data identifying each magazine loaded in the player is stored. The block diagram shown in FIG. 29 shows a process in which the magazine loaded in the player is identified on the basis of the contents of the stored data. The flowcharts of FIGS. 30, 31 and 32 describe these processes in more detail.

Figure 1:
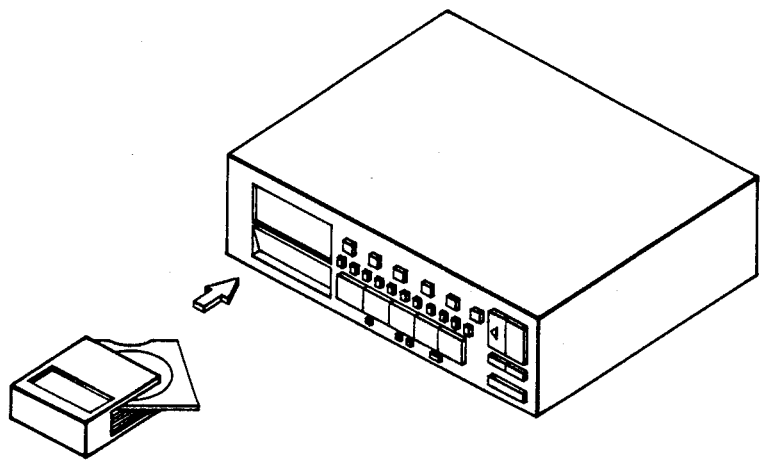
FIG. 1 shows an example of a magazine-housed disk reproducing apparatus.
Figure 2:
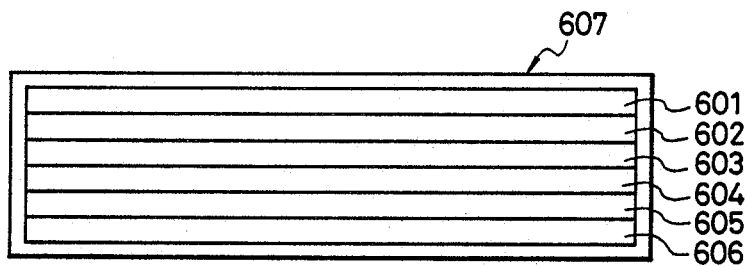
FIG. 2 is a front view of a magazine containing conventional disks.
Figure 3:
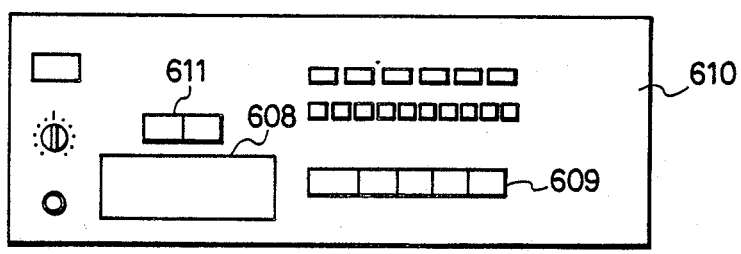
FIG. 3 shows a front view of a disk reproducing apparatus in which the magazine shown in FIG. 2 is loaded.
Figure 4:
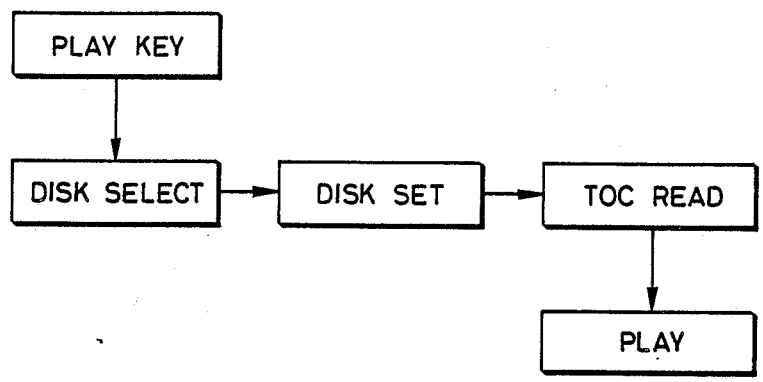
FIG. 4 is a block diagram of a process from the loading of a conventional magazine in a disk reproducing apparatus to the reproduction of a disk in the magazine.
Figure 5:
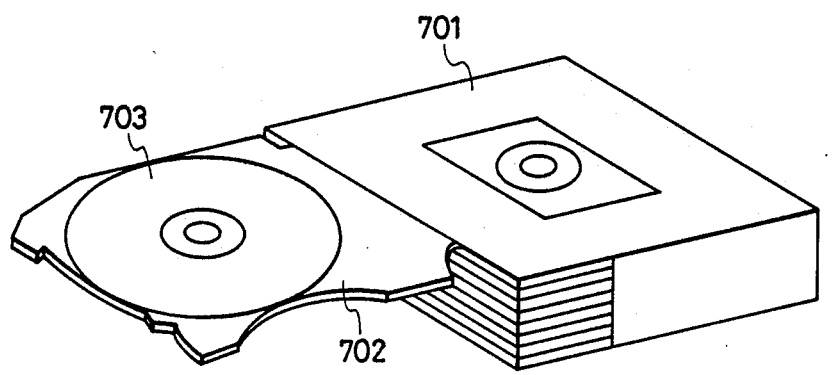
FIG. 5 is a perspective view of a magazine for a disk reproducing apparatus.

The process shown by the block diagram in FIG. 28 will now be described. After the magazine 607 containing one or more disks as shown in FIGS. 2 and 3 is loaded in a tray 608, a reproduction switch key is operated to select one of the disks. The selected disk is moved to a play back position. TOC information on the selected disk in the playback position is read. The numbers of desired tunes recorded on the selected disk and the sequence of reproduction of the desired tunes are set in a program. The program and the TOC information are stored in a memory such as the RAM (random access memory) of a microcomputer in the player. If tunes recorded not on the disks in the loaded magazine but on those in other magazines are desired to be reproduced, the latter magazines are loaded in the player in the same procedure as the former magazine to store programs and TOC information in the memory.

After the storage of this data for the magazines is completed, the process shown by the block diagram in FIG. 29 is started. In the process, the magazines are loaded in the player in accordance with a predetermined sequence or desired one of the magazines is loaded in the player. When the first disk selected is moved to the playback position, the TOC information on the disk is read by the player so as to be compared with a plurality of pieces of TOC information previously stored in the memory to identify the loaded magazine. The stored program stored together with the TOC information on the disk is read from the memory so that the desired tunes are reproduced in the designated sequence.

Although the magazine loaded in the player is identified in terms of the TOC information on the first disk in the magazine and the program information is read in the above-described embodiment, the present invention is not limited thereto, and TOC information and program information on an arbitrary disk or disks in the magazine may be stored to identify the magazine loaded in the player at the time of reproduction.

Although TOC information and program information are stored in the above-described embodiment, the present invention is not limited to such an arrangement. If six disks are housed in each magazine and the numbers of the tunes of the disks constitute a relatively random series such as 8, 10, 5, 8, 8 and 10, the series may be stored together with the TOC information. The total time of reproduction of each of the disks may be stored instead of the number of the tunes thereof. In such cases, since TOC information on a plurality of disks needs to be read, such methods are less easy with respect to operation than the method in which the magazine is identified in terms of the TOC information on the single disk in the above-described embodiment.

The program information and auxiliary code information recorded on a disk to identify a magazine may be stored in the memory in the player to identify the magazine.

Not only TOC information or the like for identifying the magazines and program information, but also information on the numbers, etc., of a plurality of magazines may be stored together in the memory in the player.

Although the above-described embodiment relates to a reproduction system for audio disks, the present invention is not confined thereto and may be embodied as a reproduction system for video disks.

In a reproduction system provided for an optical disk player in accordance with the present invention, TOC information or the like on optical disks housed in magazines and prescribed program information on the optical disks are stored in the player so as to be read to identify the magazine loaded in the player, and the optical disks can be reproduced in accordance with the prescribed program without setting the program again.

Figure 33:
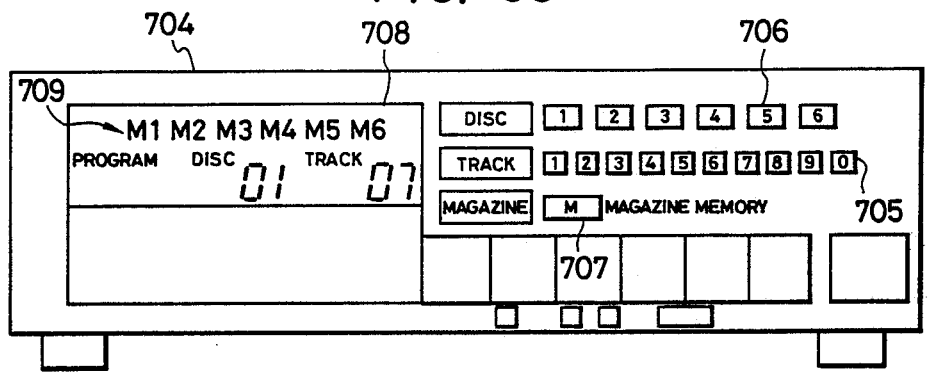
FIG. 33 shows a front view of a disk reproducing apparatus constructed according to an eighth embodiment of the invention.

FIG. 33 shows a front view of another disk player of the invention. The front panel of the disk player 704 is provided with ten digit keys 705 for entering digits 0, 1, 2, 3, 4, 5, 6, 7, 8 and 9, disk number keys 706 for entering the numbers of information disks 703, a magazine registration key 707, and a display section 708 for showing the numbers of magazines, disks and tracks. The numbers of the magazines and the tracks are entered by the ten digit keys 705. The display section 708 has magazine number display portions 709 for indicating the numbers of the magazines.

Figure 34:
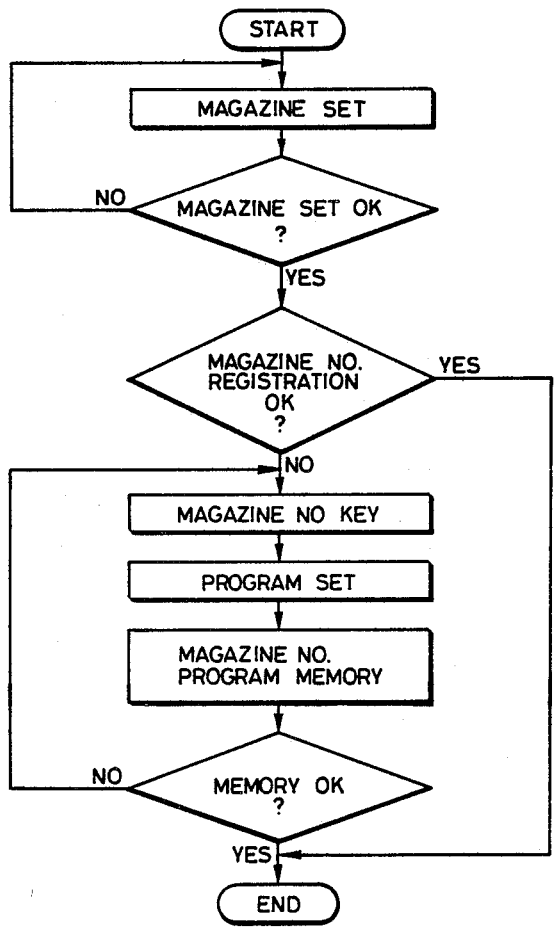
FIGS. 34 and 35 are flowcharts showing examples of the operation of the disk reproducing apparatus of the embodiment of FIG. 33.

The operation of the disk player 704 will now be described. When each magazine 701 is loaded in the disk player 704, the number of the magazine is entered as M1 by using the ten digit keys 705 and the magazine registration key 707. As a result, the magazine number M1 is shown by a magazine number display portion 709 of the display section 708. After that, a program for the information disks 703 housed in the magazine 701 whose number is registered is set and then entered by the magazine registration key 707 so that the program is stored. Such operation is performed for all the magazines 701 so that programs for the magazines and the information disks 703 housed in the magazines are stored. The operation is shown by a flowchart in FIG. 34.

Figure 35:
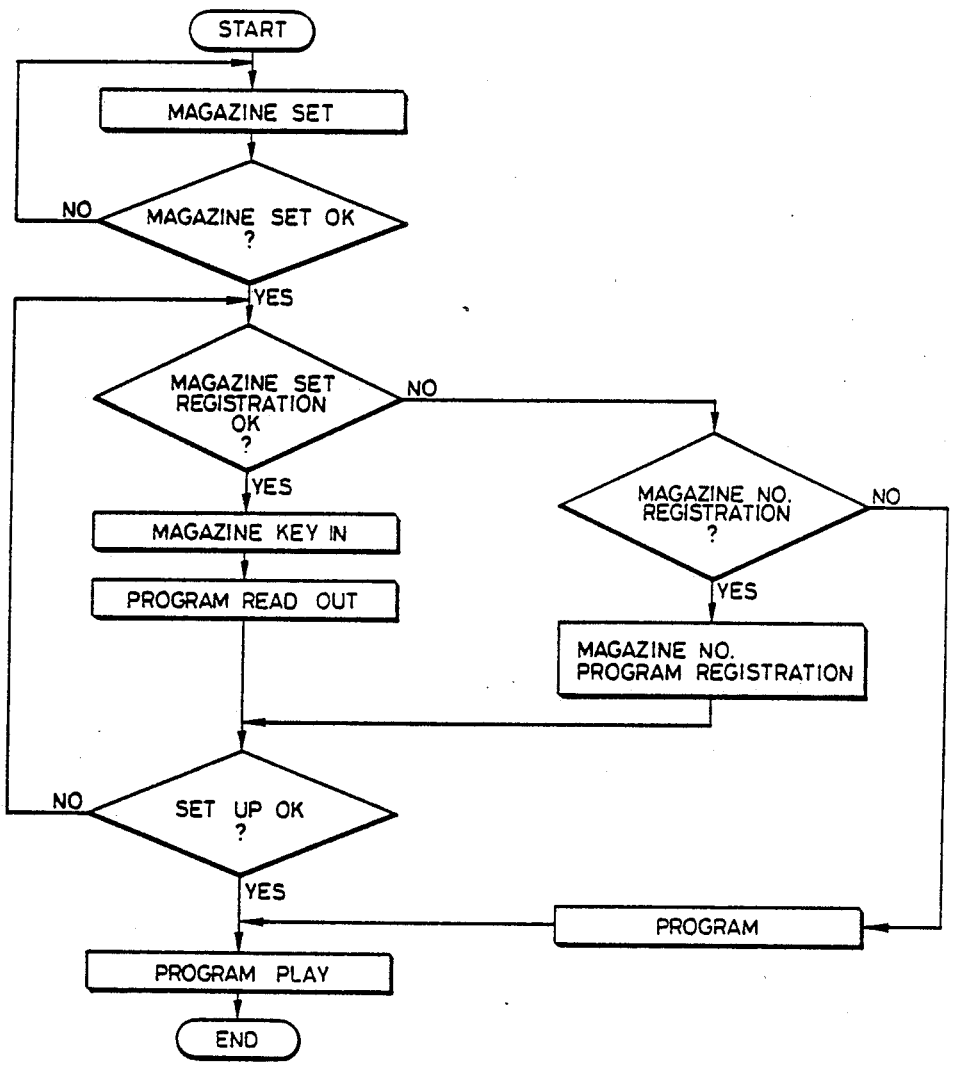

When the magazine 701 is loaded in the disk player 704 in which the program relating to the magazine is already stored, the display portion 709 for the stored number of the magazine is flashed on and off so that the magazine number stored in the disk player 704 is visually recognized. If the number of the loaded magazine 701 is the same as that shown by the display portion 709, the number of the magazine is appointed by the ten digit keys 705 so that the program stored in the disk player 704 is utilized for reproduction. Even if the number of the magazine 701 loaded in the disk player 704 is not stored therein, the number can be stored therein by using the number of a magazine number display portion 709 not turned on and off. Such an operation is shown by the flowchart of FIG. 35.

Although an optical disk such as a compact disk is optimal as the information disk 703 in the above-described embodiment, a magnetic recording disk (floppy disk), a capacitive recording disk, or the like may be used as the information disk 703.

In a disk player provided in accordance with the present invention, one of a plurality of magazines each containing a plurality of information disks is loaded to selectively reproduce the information disks, and operation keys for entering the numbers of the magazines and a display section for showing the magazine numbers entered by the operation keys are provided so that information for the disks housed in the magazines and program information for the magazines can be utilized to eliminate the inconvenience of operation which would result from the replacement of the magazines.

What is claimed is:

1. A disk player for playing disks housed in a plurality of magazines, each magazine identified by a different identification mark carried by the magazine and in which a selected one of said plurality of magazines containing one or more disks and carrying an identification mark thereon to identify that magazine is loaded, said disks of said loaded magazine being selectively moved to a reproducing section and reproduced, comprising:

reproduction control means for controlling said reproducing section in accordance with a command;

memory means in the player for storing magazine content information indicative of the contents of the disks housed in each of said plurality of magazines; and reading means for reading said identification mark carried by the one of said magazines loaded into said player and for causing said magazine content information corresponding to the magazine identified by the read identification mark to be read from said memory means.

2. The magazine-housed disk player according to claim 1, wherein currently reproduced tune information is supplied to said reading means by said reproduction control means, and said currently reproduced tune information is included in the read magazine content information by said reading means.

3. In a disk player system for playing disks housed in a plurality of magazines and in which, when one of said magazines containing one or more disks is loaded into said disk player, said disks are alternatively pulled out of said magazine and reproduced, comprising:
   identification marks provided on the outside surfaces of the magazines, each of said magazines being identified by a different identification mark;
   identification mark detection means provided to read the identification mark on a magazine when the magazine is loaded in said player;
   means in said player for storing a reproduction sequence of the disks in each of said plurality of magazines; and
   means responsive to the detected identification mark for causing the disks in the loaded magazine to be reproduced in accordance with the stored reproduction sequence for the disks of the loaded magazine.

4. The magazine-housed disk player according to claim 3, wherein each of the identification marks is constituted by a plurality of notches provided in an end of said magazine.

5. The magazine-housed disk player according to claim 3, wherein each of said identification marks is constituted by a bar code provided on a side of the magazine.

6. In a disk player system for playing disks housed in a plurality of magazines, each magazine being identified by a different identification signal, and in which, when a magazine containing one or more disks is loaded, said disks are alternatively pulled out of said magazine and reproduced, comprising:
   a variable characteristic circuit means for generating an identification signal identifying a magazine and an external connection terminal for detection of said identification signal provided in each of said magazines;
   a characteristic detection circuit means having a connection terminal removably connected to said external connection terminal when said magazine is loaded in said player for detecting the identification signal generated by the loaded magazine;
   means in said player for storing a reproduction sequence for effecting a reproduction of a disk of the loaded magazine in a preselected manner, and; and
   means response to the detected identification signal identifying the loaded magazine for effecting reproduction of a disk of the loaded magazine in accordance with the stored reproduction sequence preselected for the disks of the loaded magazine.

7. A disk player for playing disks housed in a plurality of magazines, each magazine identified by a different identification mark carried by the magazine and in which a magazine, containing one or more disks and carrying an identification mark thereon identifying that disk, is loaded, said disks of the loaded magazine being alternatively moved to a reproducing section and reproduced, comprising:
   memory means in said player for storing magazine content information indicative of the contents of the disks housed in each of said plurality of magazines;
   reading means for reading said identification mark carried by the magazine loaded in said player and for causing said magazine content information corresponding to the magazine identified by the read identification mark to be read from said memory means;
   tune content information reading means for reading tune content information from a recording medium; and
   display signal generation means by which said read magazine content information and said read tune content information are alternatively sent out as display information.

8. A reproduction system for an optical disk player, comprising: a plurality of magazines, each containing one or more optical disks, said magazine being loaded in said player, a memory provided in said player for simultaneously storing information for each of said optical disks of said plurality of magazines and program information for the tunes on said disks and the sequences of reproduction of said tunes;
   and means for loading a selected one of said magazines in said player for reproduction of tunes in said magazine identified in response to said information stored in said memory, so that said tunes are automatically reproduced in accordance with said program information stored in said memory.

9. In a disk player in which one of a plurality of magazines, each identified by a magazine number and containing a plurality of information disks, is loaded so that said disks can be selectively reproduced, the improvement comprising:
   means, in said disk player, for storing information relative to the contents of a magazine and the magazine number corresponding to the magazine;
   operation of keys for entering magazine numbers;
   a display section for showing said magazine numbers entered by said keys; and
   means, responsive to an entered magazine number, for reading the stored information corresponding to the magazine whose number has been entered, to carry out reproduction of the information read out.

* * * * *